(12) United States Patent
Peng et al.

(10) Patent No.: US 11,605,399 B2
(45) Date of Patent: Mar. 14, 2023

(54) HIGH-PRECISION SERVO SYSTEM FOR ADVANCED MAGNETIC TAPE STORAGE SYSTEM

(71) Applicant: QUANTUM CORPORATION, San Jose, CA (US)

(72) Inventors: James P. Peng, Santa Maria, CA (US); Turguy Goker, Oceanside, CA (US); George Saliba, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 17/683,099

(22) Filed: Feb. 28, 2022

(65) Prior Publication Data

US 2023/0033978 A1 Feb. 2, 2023

Related U.S. Application Data

(60) Provisional application No. 63/226,126, filed on Jul. 27, 2021.

(51) Int. Cl.
  *G11B 5/592* (2006.01)
  *G11B 5/024* (2006.01)

(52) U.S. Cl.
  CPC .......... *G11B 5/5928* (2013.01); *G11B 5/024* (2013.01)

(58) Field of Classification Search
  None
  See application file for complete search history.

(56) References Cited

U.S. PATENT DOCUMENTS

| | | | | |
|---|---|---|---|---|
| 5,218,498 | A * | 6/1993 | Jagielinski | G11B 5/4893 |
| 5,442,499 | A * | 8/1995 | Emori | G11B 5/59655 |
| | | | | 360/48 |
| 5,452,152 | A * | 9/1995 | Rudi | G11B 5/584 |
| 5,689,384 | A * | 11/1997 | Albrecht | G11B 5/584 |
| 6,058,084 | A * | 5/2000 | Yamamoto | G11B 19/04 |
| 9,251,827 | B2 | 2/2016 | Cherubini et al. | |
| 10,685,673 | B2 | 6/2020 | Kilbey et al. | |
| 2003/0016467 | A1* | 1/2003 | Bui | G11B 5/584 |
| 2003/0218821 | A1* | 11/2003 | Sado | G11B 5/59633 |
| | | | | 360/77.02 |
| 2004/0032685 | A1* | 2/2004 | Trabert | G11B 5/584 |
| 2004/0208694 | A1* | 10/2004 | Nakao | G11B 5/584 |
| 2005/0152067 | A1* | 7/2005 | Yip | G11B 5/29 |
| 2010/0080101 | A1* | 4/2010 | Rochat | G11B 20/1816 |

* cited by examiner

*Primary Examiner* — Peter Vincent Agustin
(74) *Attorney, Agent, or Firm* — Roeder & Broder LLP; James P. Broder

(57) ABSTRACT

A servo system for a magnetic tape storage system includes a magnetic tape (550) including a first servo band (573), and a first data band (575). An auxiliary servo pattern (575A) is embedded within the first data band (575). The auxiliary servo pattern (575A) is modified to generate an updated auxiliary servo pattern (688A) during a writing pass as data is being written to the first data band (575). The servo system can further include a magnetic tape drive (326) including a head assembly (456) having (i) a first write head (482) that writes data to the magnetic tape (550) as the magnetic tape (550) moves relative to the head assembly (456) in a first tape direction, (ii) a second write head (484) that writes data to the magnetic tape (550) as the magnetic tape (550) moves relative to the head assembly (456) in a second, opposite tape direction, and (iii) an auxiliary servo reader (487) positioned in a shadow of one of the first write head (482) and the second write head (484).

22 Claims, 9 Drawing Sheets

HIGH-PRECISION SERVO SYSTEM FOR ADVANCED MAGNETIC TAPE STORAGE SYSTEM

RELATED APPLICATION

This application claims priority on U.S. Provisional Application Ser. No. 63/226,126 filed on Jul. 27, 2021 and entitled "HIGH-PRECISION SERVO SYSTEM FOR ADVANCED MAGNETIC TAPE STORAGE SYSTEM". As far as permitted, the contents of U.S. Provisional Application Ser. No. 63/226,126 are incorporated in their entirety herein by reference.

BACKGROUND

Automated tape library systems (or "tape libraries") are commonly utilized for purposes of writing data to and reading data from magnetic tape cartridges. Magnetic tape cartridges are configured to retain and/or store magnetic tape that can be used in a magnetic tape drive for purposes of writing data to and reading data from the magnetic tape. Magnetic tape cartridges have been used extensively because they provide a convenient way to house and support a length of magnetic tape for engagement by a transducer (or tape head, sometimes simply referred to as a "head") in the magnetic tape drive while protecting the magnetic tape upon removal of the cartridge. Moreover, magnetic tape cartridges facilitate economic and compact storage of data. During use of the magnetic tape drive, a tape head of the magnetic tape drive is configured to be in direct contact with the magnetic tape from the magnetic tape cartridge so that data can be written to and read from the magnetic tape as the magnetic tape moves across the tape head at varying speed from low speed to high speed. Such tape heads can include dedicated write heads, dedicated read heads, or combination read/write heads.

Unfortunately, accurate writing of data to magnetic tapes or reading data from magnetic tapes that are used for long-term data storage is becoming increasingly complicated due to increasing track density in current and future LTO-compatible tape cartridges. More particularly, conventional timing-based servo (TBS) is not sufficiently accurate to support future magnetic tape storage systems that demand larger capacity, narrower trackwidth, and fast data rate. For example, any speed variation during writing or reading of the data can modulate the feedback from the TBS pattern. Moreover, the system may lack the accuracy to precisely control the lateral position of the writer that moves along the data tracks. Additionally, the feedback rate from the TBS is often too low to ensure proper track-following operation. Moreover, attempts to further include an auxiliary servo pattern (such as an additional high-density servo pattern) in a dedicated area of the magnetic tape can consume precious tape area, thereby reducing data capacity on the magnetic tape usable for storing user data.

FIG. 1 is a prior art representation of a typical tape layout for Linear Tape Open (LTO) enterprise format. In particular, as illustrated, a typical LTO-based tape 100P includes a plurality of servo bands 102P (five servo bands are shown in this embodiment), with one servo band 102P positioned near each of the lateral edges 104P of the tape 100P along a length (illustrated with a two-headed arrow labeled "L") of the tape 100P, and a plurality of data bands 106P (four data bands are shown in this embodiment) that are positioned along the length L of the LTO tape 100P between the outermost servo bands 102P and that are spaced apart from one another with additional servo bands 102P positioned therebetween. For example, as shown in FIG. 1, from one lateral edge 104P1 to the other lateral edge 104P2 on this typical LTO tape 100P, the tape 100P includes a first servo band 102P (labeled "Servo Band 0"), a first data band 106P (labeled "Data Band 3"), a second servo band 102P (labeled "Servo Band 1"), a second data band 106P (labeled "Data Band 1"), a third servo band 102P (labeled "Servo Band 2"), a third data band 106P (labeled "Data Band 0"), a fourth servo band 102P (labeled "Servo Band 3"), a fourth data band 106P (labeled "Data Band 2"), and a fifth servo band 102P (labeled "Servo Band 4"). It is appreciated that the labeling of the data bands 106P is provided to demonstrate the typical order in which the data bands 106P are written to on the typical LTO tape 100P, i.e. first write to Data Band 0, next write to Data Band 1, then write to Data Band 2, and finally write to Data Band 3.

An exemplary tape head 108P is also shown as having two modules and as being positioned over a portion of the tape 100P. Read and/or write heads may be positioned on either module of the tape head 108P, and may be used to read data from and/or write data to the data bands 106P. Additionally, the tape head 108P may include servo readers 110P (also referred to as "servo heads") which may be used to read the servo patterns in the servo bands 102P.

As shown in FIG. 1, the servo bands 102P are timing-based servo bands that typically include a chevron pattern, having a height that is measured in a cross-track direction which is approximately orthogonal to a length L of the tape 100P. As illustrated, the lateral location of a servo head 110P of a tape drive relative to the height of a respective servo band 102P can be derived from a timing ratio NB, such as shown in FIG. 1. It is appreciated that depending on the lateral position of the servo head 110P, the value for A will change, while the value for B will remain the same. Thus, a lower timing ratio (a lower value for A) will indicate that the servo head is positioned closer to a top of the chevron pattern, while a higher timing ratio (a higher value for A) will indicate that the servo head is positioned closer to a bottom of the chevron pattern.

Overall, the servo bands 102P can occupy 3-4% of the tape area and a typical set of the chevron pattern can expand over 70 to 100 μm in the lateral direction. The servo precision is a function of the slant angle of the chevron, where too much skew can impact the signal-to-noise ratio (SNR). In various embodiments, the feedback rate is approximately 15-20 μ-second for 5 m/s tape speed.

As noted, other proposals to improve the accuracy and response time have entailed adding additional auxiliary high density HD servo patterns on dedicated areas (illustrated in FIG. 2) of the magnetic tape. Unfortunately, such proposals have experienced negative impacts because they will consume desired additional data capacity. For example, in certain previous attempts to provide enhanced servoing for LTO systems, the servo systems have faced issues such as (i) Took 3% data capacity with the use of dedicated auxiliary servo tracks; (ii) Slow feedback rate (every 76 μm) for position error signal (PES), where a faster feedback rate is required for high speed, high density data tracks; (iii) Tape Velocity can be estimated; (iv) Hard to write, susceptive to written in error; and (v) Additional error due to speed variation (worst on the smallest AB distance track).

FIG. 2 is a prior art illustration of one attempt to improve accuracy and response time of a tape drive by adding auxiliary high-density (HD) servo patterns 212P on dedicated areas of a tape 200P, which are provided in addition to the typical legacy servo patterns 202P, such as described in U.S. Pat. No. 10,685,673 B2 issued to Kilbey, et al. on Jun. 16, 2020. In some such implementations, the addition of the auxiliary servo patterns 212P to the typical legacy servo patterns 202P may be able to address certain limitations of standard systems by improving track-following performance. For example, in one such implementation, the auxiliary servo pattern 212P may include periodic waveforms of various frequencies alternately written in the length direction. With such design, the system can enable more accurate and more frequent estimates of servo channel parameters, thereby achieving improved head positioning at a much wider range of tape velocities and support for larger bandwidth head actuation.

However, in such cases, the auxiliary HD servo patterns 212P utilize extra tape area, such that such extra tape area is no longer available for writing data. Also, the location of the auxiliary HD head away from the data head cannot accurately observe the location of the write and read active head, and it is well known that the tape dimensional stability at the auxiliary HD data adds significant error to the actual new written data. Thus, such prior art embodiments can provide some improvement to the accuracy and response time of the tape drive, but only at the sacrifice of desired tape area that can otherwise be used for data, and they cannot correct for issues with dimensional tape stability.

SUMMARY

The present invention is directed toward a servo system for use within a magnetic tape storage system. In various embodiments, the servo system includes a magnetic tape including (i) a first servo band including a timing-based servo pattern, and (ii) a first data band that is configured such that data is to be written to and read from the first data band. In such embodiments, an auxiliary servo pattern is embedded within the first data band, and the auxiliary servo pattern is modified to generate an updated auxiliary servo pattern during a writing pass as data is being written to the first data band and/or one or more data tracks.

In certain embodiments, the auxiliary servo pattern is an initial auxiliary servo pattern that is embedded within the first data band by a tone writer prior to any data being written to the first data band and/or the one or more data tracks (or after all previous data has been erased from the first data band and/or one or more data tracks). In some such embodiments, the magnetic tape can include a plurality of data bands, and the auxiliary servo pattern can be an initial auxiliary servo pattern that is embedded within each data band by the tone writer prior to any data being written to the first data band and/or the one or more data tracks. In another embodiment, the auxiliary servo pattern can be written at periodic intervals, such as within gaps between data blocks within the first data band, where no data is typically written within such gaps.

In some embodiments, the servo system further includes a magnetic tape drive including a head assembly that is configured to write data to any and all data bands, including the first data band, of the magnetic tape. In one embodiment, the tone writer is positioned within the magnetic tape drive. In another embodiment, the tone writer is configured to embed the initial auxiliary servo pattern to any and all data bands, including the first data band, during manufacturing of the magnetic tape.

In various embodiments, the servo system further includes a magnetic tape drive including a head assembly that is configured to write data to the data bands of the magnetic tape, the head assembly having (i) a first write head that is configured to write data to the magnetic tape as the magnetic tape moves relative to the head assembly in a first tape direction, (ii) a second write head that is configured to write data to the magnetic tape as the magnetic tape moves relative to the head assembly in a second tape direction that is opposite to the first tape direction, and (iii) an auxiliary servo reader that is positioned in a shadow of one of the first write head and the second write head.

In some embodiments, the first write head is a forward write head that is configured to write data to the magnetic tape as the magnetic tape moves relative to the head assembly in a forward direction; and the second write head is a reverse write head that is configured to write data to the magnetic tape as the magnetic tape moves relative to the head assembly in a reverse direction.

In certain embodiments, the second write head is further configured to modify the auxiliary servo pattern to generate the updated auxiliary servo pattern during a writing pass as data is being written by the first write head to the first data band. In some embodiments, the auxiliary servo reader is configured to read the updated auxiliary servo pattern during the writing pass to determine a lateral position of the head assembly relative to the magnetic tape.

In one embodiment, the second write head employs ac erase functionality to modify the auxiliary servo pattern to generate the updated auxiliary servo pattern during the writing pass as data is being written by the first write head to the first data band.

In some embodiments, the auxiliary servo reader is positioned in the shadow of the second write head.

In certain embodiments, the magnetic tape drive further includes a drive controller that is communicatively coupled to the head assembly, the drive controller being configured to receive information from the auxiliary servo reader to generate a signal based at least in part on the updated auxiliary servo pattern that has been read by the auxiliary servo reader during the writing pass.

In some embodiments, the magnetic tape drive further includes an actuator that is coupled to the head assembly, the actuator being controlled by the drive controller to adjust the lateral position of the head assembly relative to the magnetic tape based at least in part on the updated auxiliary servo pattern that has been read by the auxiliary servo reader during the writing pass.

In one embodiment, the head assembly includes (i) a first bump in the form of a forward write bump that includes the first write head, (ii) a second bump in the form of a read head bump that includes the auxiliary servo reader, and (iii) a third bump in the form of a reverse write bump that includes the second write head. In one such embodiment, the head assembly can be a three-bump head assembly including such components. In other such embodiments, the head assembly can include more than three bumps.

In some embodiments, the head assembly further includes a TBS servo reader that is configured to read the timing-based servo pattern included in the first servo band.

The present invention is further directed toward a servo system for use within a magnetic tape storage system, the servo system including a magnetic tape drive including a head assembly having (i) a first write head that is configured to write data to a magnetic tape as the magnetic tape moves relative to the head assembly in a first tape direction, (ii) a second write head that is configured to write data to the magnetic tape as the magnetic tape moves relative to the head assembly in a second tape direction that is opposite to the first tape direction, and (iii) an auxiliary servo reader that is positioned in a shadow of one of the first write head and the second write head.

The present invention is also directed toward a method for monitoring a lateral position of a head assembly of a tape drive relative to a magnetic tape that is configured to move across the head assembly as the head assembly writes data to and reads data from the magnetic tape, the method including the steps of providing a magnetic tape including (i) a first servo band including a timing-based servo pattern, and (ii) a first data band that is configured such that data is to be written to and read from the first data band; embedding an auxiliary servo pattern within the first data band; and modifying the auxiliary servo pattern to generate an updated auxiliary servo pattern during a writing pass as data is being written to the first data band and/or one or more data tracks.

The present invention is also directed toward a method for monitoring a lateral position of a head assembly of a tape drive relative to a magnetic tape that is configured to move across the head assembly as the head assembly writes data to and reads data from the magnetic tape, the method including the steps of providing a magnetic tape drive including a head assembly having a first write head, a second write head, and an auxiliary servo reader; writing data to a magnetic tape with the first write head as the magnetic tape moves relative to the head assembly in a first tape direction; writing data to the magnetic tape with the second write head as the magnetic tape moves relative to the head assembly in a second tape direction that is opposite to the first tape direction; and positioning the auxiliary servo reader in a shadow of one of the first write head and the second write head.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a high-precision servo system for use within an advanced magnetic tape storage system. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
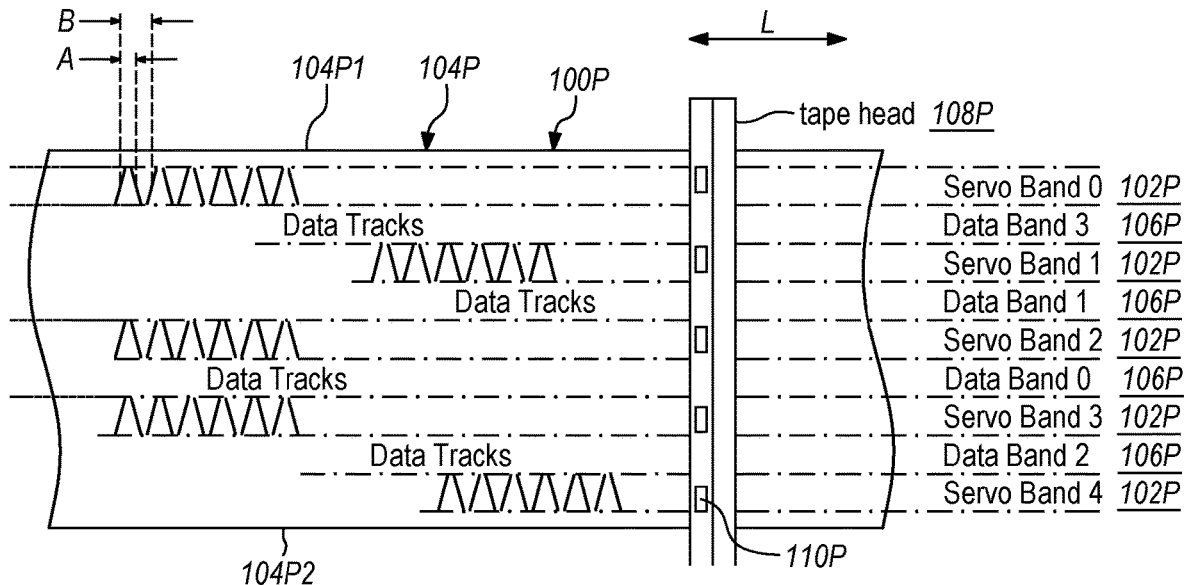
FIG. 1 is a prior art representation of a typical tape layout for Linear Tape Open (LTO) enterprise format.
Figure 2:
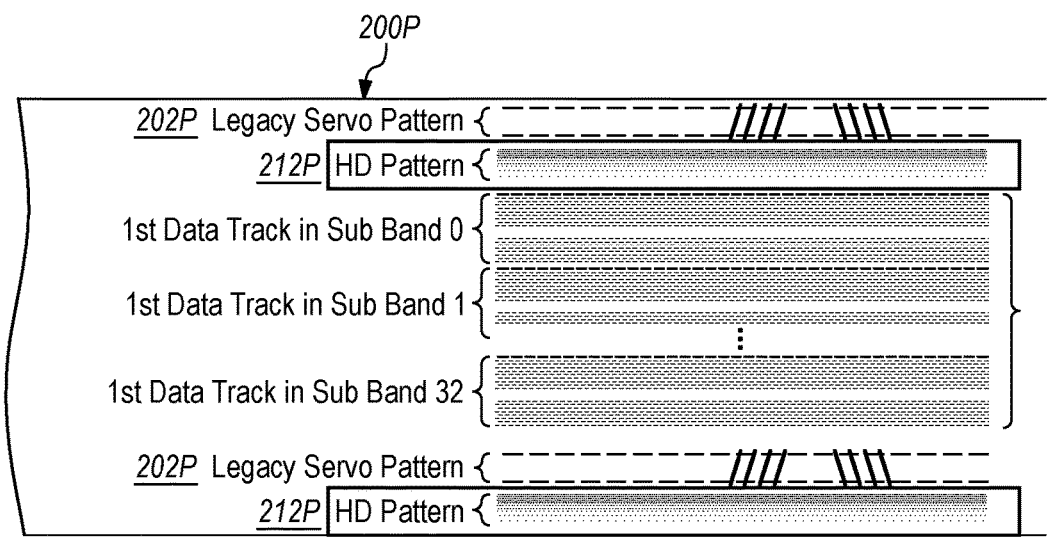
FIG. 2 is a prior art illustration of one attempt to improve accuracy and response time of a tape drive by adding auxiliary high-density (HD) servo patterns on a dedicated area of a magnetic tape.
Figure 3:
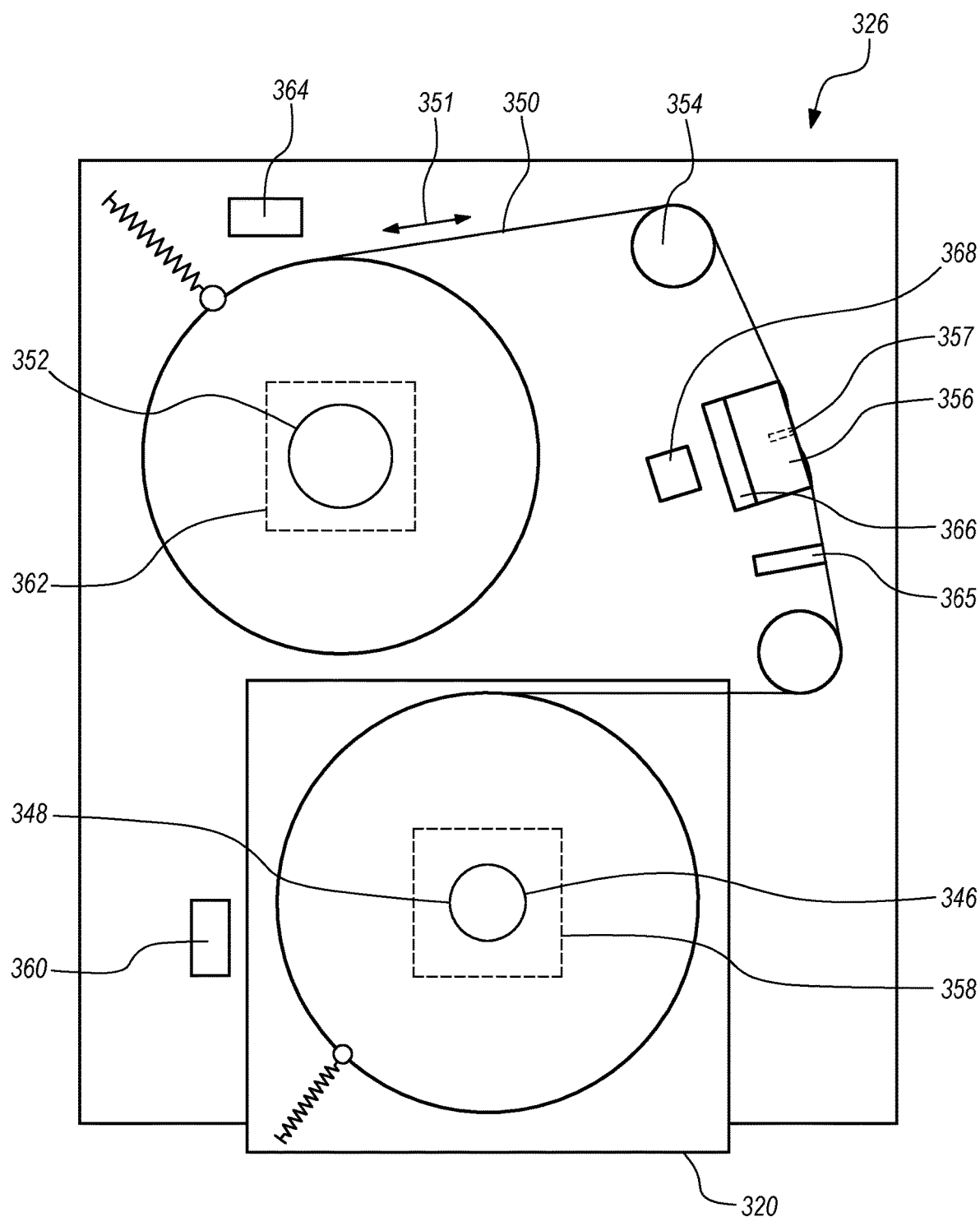
FIG. 3 is a simplified schematic top view illustration of a tape drive having features of the present invention, and a tape cartridge that has been inserted into the tape drive, which can be included as part of a tape library system.

FIG. 3 is a simplified schematic top view illustration of a magnetic tape drive 326 (also sometimes referred to herein simply as a "tape drive"), and a magnetic tape cartridge 320 (also sometimes referred to herein simply as a "tape cartridge") that has been inserted into the tape drive 326, which can be included as part of a tape library system. In FIG. 3, covers for the tape drive 326 and the tape cartridge 320 have been omitted for clarity so that the interior of such components is visible. It is appreciated that the tape drive 326 as shown in FIG. 3 represents a generic tape drive, and is shown by way of example and not by way of limitation. In some embodiments, the tape drive 326 operates in compliance with an LTO specification, such as LTO-8 or LTO-9. Stated in another manner, in such embodiments, the tape cartridge 320 is an LTO-compatible tape cartridge.

During use of the tape drive 326, the tape cartridge 320 is inserted into a drive housing 340 of the tape drive 326 so that the tape drive 326 can read data from and/or write data to the tape cartridge 320. As shown, the tape cartridge 320 includes a cartridge reel 346 that includes and/or defines a cartridge hub 348. A magnetic tape 350 is spooled about the cartridge hub 348 of the cartridge reel 346. In certain embodiments, the magnetic tape 350 can include at least one servo track (not shown) and a plurality of data tracks (not shown) that run along a longitudinal length of the magnetic tape 350. Each of these tracks can be positioned substantially parallel to each other.

Figure 5:
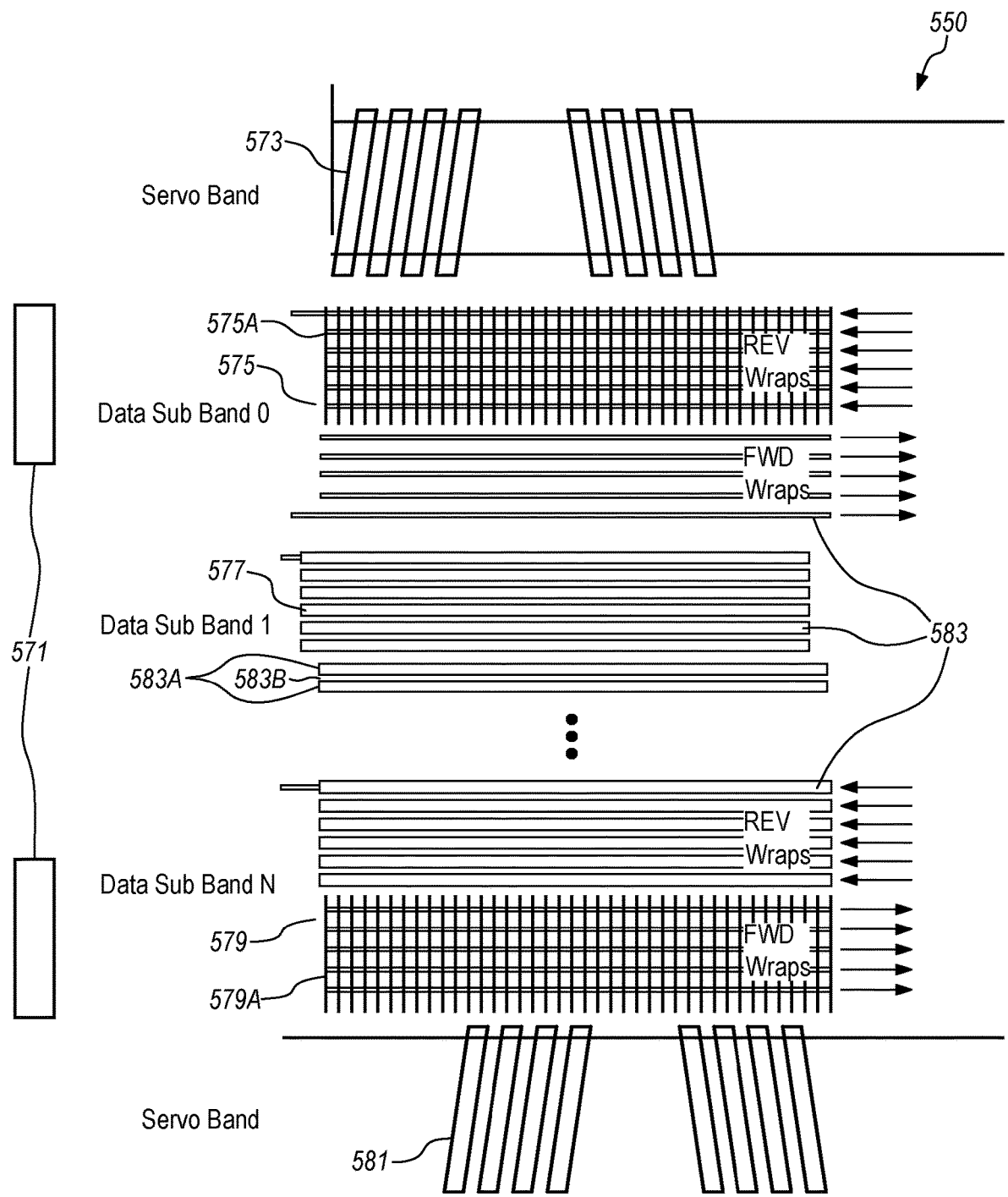
FIG. 5 is a simplified schematic illustration of a magnetic tape and a pair of tone writers that are usable as part of the present invention.

In accordance with the features of the present invention, and as illustrated in FIG. 5, in some embodiments, the magnetic tape 350 can include one or more auxiliary servo tracks that are embedded within one or more of the data tracks, and that are updated and/or modified as data is written to the data tracks in a series of writing passes.

The tape cartridge 320 supplies the magnetic tape 350 to the tape drive 326. More particularly, when the tape cartridge 320 is inserted into the tape drive 326, one end of the magnetic tape 350 is taken up within the tape drive 326 to be wrapped around a drive reel 352 included in the tape drive 326. The magnetic tape 350 traverses a predefined path 351 between the cartridge reel 346 and the drive reel 352, which is defined, a least in part, by one or more rollers 354 (two are shown in FIG. 3) positioned at strategic positions along the predefined path 351. The rollers 354 may also aid in limiting gross lateral movement (i.e. in and out of the page as shown in FIG. 3) of the magnetic tape 350, i.e. lateral tape motion or "LTM".

Along the predefined path 351, the drive reel 352 moves the magnetic tape 350 across a tape head assembly 356 (also sometimes referred to herein as a "head assembly", "tape heads" or simply as a "head") that is configured to write data to and/or read data from the magnetic tape 350. In alternative embodiments, the head assembly 356 can include at least one read head, at least one write head, and/or at least one read/write head. In particular, the head assembly 356 is positioned in close proximity to the predefined path 351 of the magnetic tape 350 such that as the magnetic tape 350 travels in the longitudinal direction (by being wound from the cartridge reel 346 to the drive reel 352 or vice versa) the head assembly 356 can read/write data to particular tracks and longitudinal positions of the magnetic tape 350. The head assembly 356 and/or a separate head assembly can also include one or more servo elements or servo readers 357 (illustrated in phantom) configured to read the servo track(s) of the magnetic tape 350 in order to effectively maintain proper alignment between the head assembly 356 and the magnetic tape 350. It is appreciated that the tape drive 326 can include any suitable number of tape heads within the head assembly 356 for purposes of writing data to and/or reading data from the magnetic tape 350. For example, in one non-exclusive embodiment, the head assembly 356 can include 32 tape heads for purposes of writing data to and/or reading data from the magnetic tape 350.

In some embodiments, as shown, the tape drive 326 can also include a cartridge reel motor 358 (illustrated as a box in phantom) that generates the necessary force to rotate the cartridge reel 346 at will, and a cartridge reel encoder 360, such as a sensor or detector, that is configured to output signals representing the pulse rate (or rotation rate) of the cartridge reel motor 358. The tape drive 326 can further include a drive reel motor 362 (illustrated as a box in phantom) that generates the necessary force to rotate the drive reel 352 at will, and a drive reel encoder 364, such as a sensor or detector, that is configured to output signals representing the pulse rate (or rotation rate) of the drive reel motor 362.

In certain embodiments, as illustrated, the tape drive 326 can include one or more tone writers 365 (one is visible in FIG. 3) that are usable to write an initial auxiliary servo pattern 567 (illustrated, for example, in FIG. 5) onto the magnetic tape 350, with the initial auxiliary servo pattern 567 being embedded within the data tracks prior to any data being written to the magnetic tape 350. Alternatively, the initial auxiliary servo pattern 567 can be written onto the magnetic tape 350 and embedded within the data tracks during the manufacturing process outside of the tape drive 326. Still alternatively, the initial auxiliary servo pattern 567 can be written onto the magnetic tape 350 and embedded within the data tracks after all previous data has been erased from the magnetic tape 350. With such design, the initial auxiliary servo pattern 567 and updates and/or modifications thereto can be read from the magnetic tape 350 by the servo readers 357 to more precisely and directly determine the lateral locational position of the head assembly 356 relative to the magnetic tape 350 during the writing passes.

It is appreciated that prior to the initial auxiliary servo pattern 567 being written onto the magnetic tape 350, the magnetic tape 350 should be clean, without any data already written onto the magnetic tape 350. In one implementation, the magnetic tape 350 can be a new magnetic tape where data has never yet been written onto the magnetic tape 350. In another implementation, the magnetic tape 350 may have been previously used, but has subsequently been erased and reconditioned such that there is no evidence of any data that has been previously written to the magnetic tape 350.

Potential designs for the initial auxiliary servo pattern 567, and the subsequent modifications and/or updates thereto during the writing passes will be described in greater detail herein below.

As illustrated in this embodiment, the tape drive 326 also includes an actuator 366 and a drive controller 368 that can be communicatively coupled to the head assembly 356. The actuator 366 is configured to control the lateral position of the head assembly 356 and/or the individual tape heads of the head assembly 356 relative to the magnetic tape 350 based on a signal provided by the drive controller 368 and the servo patterns read by the servo elements 357. As such, the actuator 366 comprises a mechanical positioner to move the head assembly 356 up or down laterally. By controlling the lateral position of the head assembly 356 relative to the magnetic tape 350, particular tracks of the magnetic tape 350 can be accessed as desired. Alternatively, the tape drive 326 can include more than one actuator 366. For example, the tape drive 326 can include a separate actuator 366 for each head.

The drive controller 368 is in communication with the actuator 366 and a number of other components within the tape drive 326. For example, although not specifically shown in FIG. 3, each of the cartridge reel motor 358, the cartridge reel encoder 360, the drive reel motor 362, and the drive reel encoder 364 can be in communication with the drive controller 368. As such, the drive controller 368 can be configured to perform various specified operations, either individually, or in combination with other software, hardware and/or firmware elements.

Figure 4:
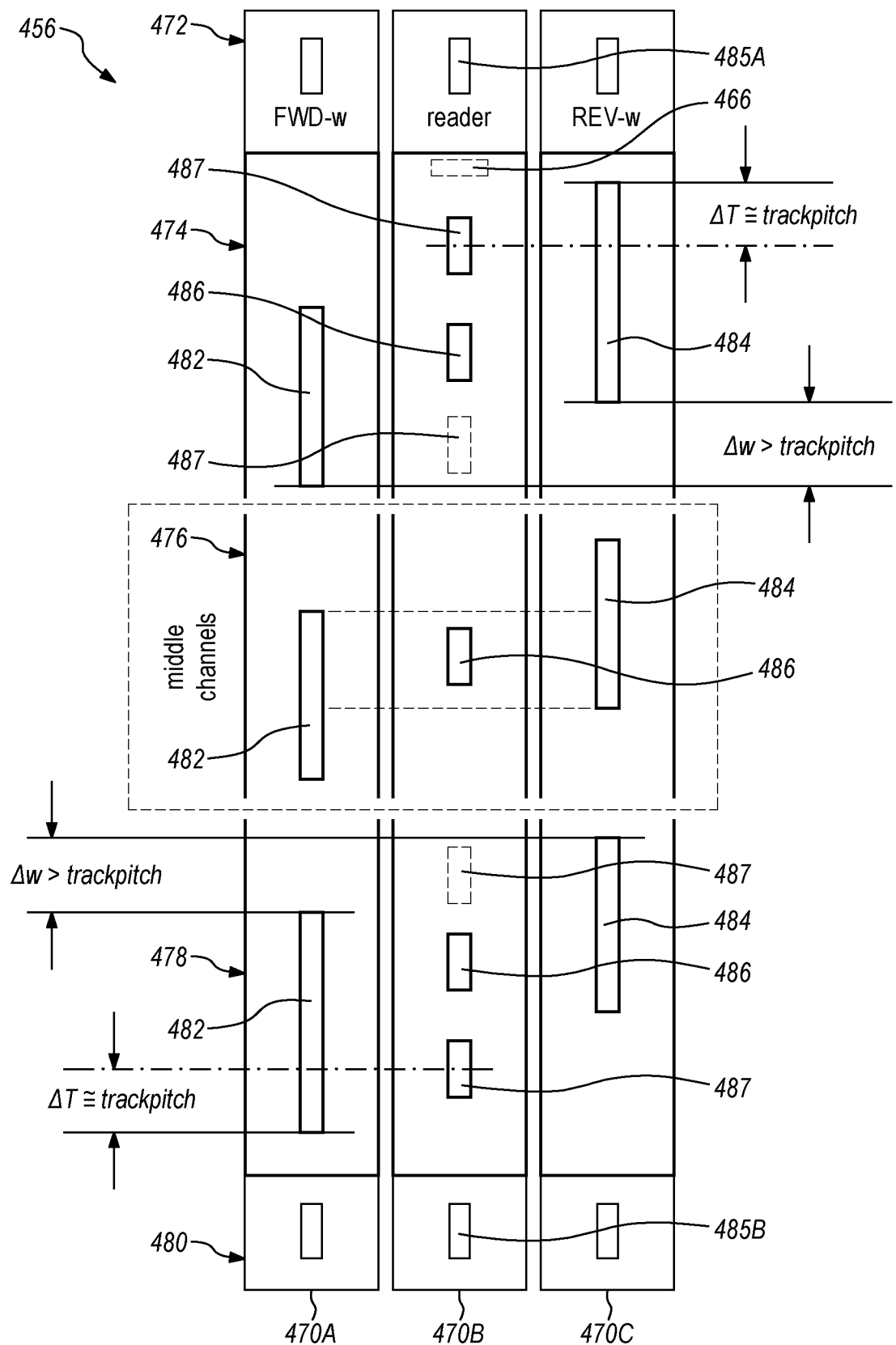
FIG. 4 is a simplified schematic illustration of a representative three-bump head assembly for use with the present invention, including a forward write head, a read head, and a reverse write head.

FIG. 4 is a simplified schematic illustration of a representative three-bump head assembly 456 for use with the present invention. As illustrated in this embodiment, the head assembly 456 includes a first bump 470A in the form of a forward write head bump, a second bump 470B in the form of a read head bump, and a third bump 470C in the form of a reverse write head bump.

FIG. 5 is a simplified schematic illustration of a magnetic tape 550 and a pair of tone writers 571 that are usable as part of the present invention. As illustrated, the magnetic tape 550 includes a first (upper) TBS servo band 573, a first outer data sub band 575, a plurality of middle data sub bands 577 (illustrated in part by a series of dots that are intended to represent the continuation of the middle data sub bands 577), a second outer data sub band 579, and a second (lower) TBS servo band 581.

As shown in FIG. 5, the first TBS servo band 573 and the second TBS servo band 581 are configured with the typical chevron pattern design to ensure an initial and appropriate starting point for the lateral positioning of the magnetic tape 550 relative to the head assembly 456 (illustrated in FIG. 4), such as prior to any data being written to the magnetic tape 550.

FIG. 5 further illustrates the first outer data sub band 575 being positioned substantially adjacent to the first TBS servo band 573 and including a pre-written initial auxiliary servo pattern 575A (labeled as "REV Wraps"), having a monotone design in this particular embodiment, which has been written to the magnetic tape 550 with one of the tone writers 571. The first outer data sub band 575 is further shown as including data tracks 583 (labeled as "FWD Wraps") that can be written onto the magnetic tape 550.

Somewhat similarly, FIG. 5 also illustrates the second outer data sub band 579 being positioned substantially adjacent to the second TBS servo band 581 and including a pre-written initial auxiliary servo pattern 579A (labeled as "FWD Wraps"), having a monotone design in this particular embodiment, which has been written to the magnetic tape 550 with the other of the tone writers 571. The second outer data sub band 579 is further shown as including data tracks 583 (labeled as "REV Wraps") that can be written onto the magnetic tape 550.

The plurality of middle data sub bands 577 are also shown in FIG. 5 to include data tracks 583.

As noted, FIG. 5 further shows the pair of tone writers 571 that are usable for purposes of writing the initial auxiliary servo patterns 575A, 579A in such a manner that they are embedded within the data sub bands of the magnetic tape 550, such as the first outer data sub band 575 and the second outer data sub band, respectively, in this particular embodiment. In some embodiments, the tone writers 571 can be included within the tape drive 326 (illustrated in FIG. 3) for purposes of writing the initial auxiliary servo patterns 575A, 579A onto the magnetic tape 550. Alternatively, the tone writers 571 can be provided and/or positioned in another suitable manner. For example, in one non-exclusive alternative embodiment, the tone writers 571 can be utilized during the tape manufacturing process for purposes of writing the initial auxiliary servo patterns 575A, 579A onto the magnetic tape 550.

Returning back to FIG. 4, as shown, each bump 470A, 470B, 470C includes (i) a first outer section 472 that is configured to largely correspond with and/or be substantially aligned with the first TBS servo band 573 (illustrated in FIG. 5) of the magnetic tape 550 (illustrated in FIG. 5) as the magnetic tape 550 moves across the head assembly 456, (ii) a first data section 474 that is configured to largely correspond with and/or be substantially aligned with the first data sub band 575 (illustrated in FIG. 5) of the magnetic tape 550 as the magnetic tape 550 moves across the head assembly 456, (iii) a plurality of middle data sections 476 (or "middle channels") that are configured to correspond with and/or be substantially aligned with the plurality of middle data sub bands 577 (illustrated in FIG. 5) of the magnetic tape 550 as the magnetic tape 550 moves across the head assembly 456, (iv) a second data section 478 that is configured to largely correspond with and/or be substantially aligned with the second data sub band 579 (illustrated in FIG. 5) of the magnetic tape 550 as the magnetic tape 550 moves across the head assembly 456, and (v) a second outer section 480 that is configured to largely correspond with and/or be substantially aligned with the second TBS servo band 581 (illustrated in FIG. 5) of the magnetic tape 550 as the magnetic tape 550 moves across the head assembly 456.

As shown, in the first bump 470A, each of the first data section 474, the plurality of middle data sections 476, and the second data section 478 includes a forward write head 482 that is usable to write data tracks 583 (illustrated in FIG. 5) onto the magnetic tape 550 during any and all forward writing passes when the magnetic tape 550 is moving in a generally forward (left-to-right) direction relative to the head assembly 456. In various implementations, during the forward writing passes, the forward write head 482 can be writing data over at least a portion of the initial auxiliary servo pattern that has been embedded within the data tracks and/or the data bands.

Somewhat similarly, in the third bump 470C, each of the first data section 474, the plurality of middle data sections 476, and the second data section 478 includes a reverse write head 484 that is usable to write data tracks 583 onto the magnetic tape 550 during any and all reverse writing passes when the magnetic tape 550 is moving in a generally reverse (right-to-left) direction relative to the head assembly 456. In various implementations, during the reverse writing passes, the reverse write head 484 can be writing data over at least a portion of the initial auxiliary servo pattern that has been embedded within the data tracks and/or the data bands.

In some embodiments, during the writing passes, the opposite direction write heads (484 for forward, 482 for reverse) can be utilized to update and/or modify the initial auxiliary servo patterns 579A, 575A (illustrated in FIG. 5) that have been embedded within the data tracks and/or the data bands. More particularly, in certain such embodiments, the reverse write heads 484 can be utilized to update and/or modify the initial auxiliary servo patterns 579A during the forward writing passes when the magnetic tape 550 is moving in a generally from left-to-right direction relative to the head assembly 456. For example, in some such embodiments, the reverse write heads 484 can employ ac erase functionality to erase all or sections of the initial auxiliary servo patterns 579A that are specifically covered by the reverse write heads 484 during forward writing passes when the magnetic tape 550 is moving in a generally from left-to-right direction relative to the head assembly 456. Alternatively, the reverse write heads 484 can update and/or modify the initial auxiliary servo patterns 579A in another suitable manner other than using ac erase functionality. Moreover, it is appreciated that in each subsequent forward writing pass, the reverse write head 484 may actually be updating and/or modifying an auxiliary servo pattern that has already been modified from the initial auxiliary servo pattern 579A.

In other such embodiments, the forward write heads 482 can be utilized to update and/or modify the initial auxiliary servo patterns 575A during the reverse writing passes when the magnetic tape 550 is moving in a generally from right-to-left direction relative to the head assembly 456. For example, in some such embodiments, the forward write heads 482 can employ ac erase functionality to erase all or sections of the initial auxiliary servo patterns 575A that are specifically covered by the forward write heads 482 during reverse writing passes when the magnetic tape 550 is moving in a generally from right-to-left direction relative to the head assembly 456. Alternatively, the forward write heads 482 can update and/or modify the initial auxiliary servo patterns 575A in another suitable manner other than using ac erase functionality. Moreover, it is appreciated that in each subsequent reverse writing pass, the forward write head 482 may actually be updating and/or modifying an auxiliary servo pattern that has already been modified from the initial auxiliary servo pattern 575A.

For purposes of another implementation of the present invention, it is appreciated that the magnetic tape 550 will typically include one or more data blocks 583A within each data sub band 575, 577, 579, with inter block gaps 583B (also sometimes referred to herein simply as "gaps") being positioned between adjacent data blocks 583A, where no data is typically written within the inter block gaps 583B. Thus, in certain embodiments, the servo system of the present invention can utilize auxiliary servo patterns such as described to function as a sample servo for use within the inter block gaps 583B between the data blocks 583A, similar to hard disk drives (HDD). More particularly, in such embodiments, during the writing passes, the opposite direction write heads (484 for forward, 482 for reverse) can be utilized to update and/or modify the initial auxiliary servo patterns 579A, 575A just in the inter block gap 583B for functioning as sample servo. For example, in some such embodiments, during the forward writing passes when the magnetic tape 550 is moving in a generally from left-to-right direction relative to the head assembly 456, the reverse write heads 484 can employ ac erase functionality to erase all or sections of the initial auxiliary servo patterns 579A that are specifically covered by the forward write heads 482. Alternatively, during the reverse writing passes, the forward write heads 482 can update and/or modify the initial auxiliary servo patterns 575A in the gap 583B. It is appreciated that since the gap 583B does not contain data, the write head that is not being used to update and/or modify the initial auxiliary servo patterns 575A can be used to write a tone or erase, thereby eliminating the need for the auxiliary eraser head or tape preconditioning.

As illustrated in the embodiment shown in FIG. 4, the second bump 470B can include a first (upper) TBS servo reader 485A in the first outer section 472 that is configured to read the servo pattern (such as the typical chevron servo pattern) within the upper TBS servo band 573; and a second (lower) TBS servo reader 485B in the second outer section 480 that is configured to read the servo pattern (such as the typical chevron servo pattern) within the lower TBS servo band 581, to establish an initial and appropriate lateral position of the head assembly 456 relative to the magnetic tape 550 before any data has been written to the magnetic tape 550. In some embodiments, each of the first bump 470A and the third bump 470C can include similar upper TBS servo readers 485A and lower TBS servo readers 485B to individually establish an initial and appropriate lateral position of each of the bumps 470A, 470B, 470C of the head assembly 456 relative to the magnetic tape 550 before any data has been written to the magnetic tape 550.

As shown in FIG. 4, the second bump 470B can further include data readers 486 in each of the data sections 474, 476, and 478 that are positioned within the width of the forward write head 482 and the reverse write head 484. As such, the data readers 486 are positioned and configured to read the desired data tracks 583 that have been written onto the magnetic tape 550 within the plurality of middle data sub bands 577 of the magnetic tape 550 in a read while writing procedure.

As illustrated in FIG. 4, each of the special data sections 474 of the second bump 470B also includes an auxiliary servo reader 487 that is positioned outside the shadow of the forward write head 482 of the corresponding data section 474, and within the shadow of the reverse write head 484 of the corresponding data section 474, the offset between the center of the servo reader 487 and the outer edge of the reverse writer 484 is maintained roughly about the designated track pitch. As such, the auxiliary servo readers 487 are positioned to read the initial auxiliary servo patterns 579A and any subsequently modified and/or updated auxiliary servo patterns that are embedded within one of the first data sub band 575 and the second data sub band 579 on the magnetic tape 550.

As shown, each of the special data sections 474 of the second bump 470B can further include another auxiliary servo reader 487 that is positioned outside the shadow of the reverse write head 484 of the corresponding data section 474, and within the shadow of the forward write head 482 of the corresponding data section 474.

As utilized herein, positioning of the auxiliary servo writer 487 within the "shadow" of one of the reverse write head 484 and the forward write head 482 is generally intended to mean that the auxiliary servo writer 487 is positioned within the width of the respective head 484, 482 and ahead of the respective head 484, 482 during relative movement between the head assembly 456 and the magnetic tape 550, but is positioned outside the width of the other of the forward write head 482 or the reverse write head 484.

It is appreciated that through the use of the auxiliary servo readers 487 and the auxiliary servo patterns 575A, 579A that are embedded within the data tracks 583 on the magnetic tape 550, the overall servo system of the present invention is able to take a more direct measurement as to the precise relative positioning between the head assembly 456 and the magnetic tape 550, as opposed to the more indirect measurements taken with the standard TBS system.

It is further appreciated that although only the first data section 474 and the second data section 478 of the head assembly 456 are illustrated and described as including the embedded servo positioning system of the present invention, any or all of the 32 data channels can be equipped to become forward or reverse or bidirectional high-density servo channels. In order for the invention to effectively operate as desired, it is merely preferred that the embedded servo positioning system include at least two such servo channels, one which operates in the forward direction and one which operates in the reverse direction.

Further illustrated in FIG. 4 is an actuator 466 (illustrated in phantom) that can be communicatively coupled to the head assembly 456. The actuator 466 is configured to control the lateral position of the head assembly 456 and/or the individual bumps 470A, 470B, 470C of the head assembly 456 relative to the magnetic tape 550 based at least in part on the TBS servo patterns read by the TBS servo readers 485A, 485B, and the auxiliary servo patterns 575A, 579A read by the auxiliary servo readers 487. As such, the actuator 466 comprises a mechanical positioner to move the head assembly 456 up or down laterally relative to the magnetic tape 550. By controlling the lateral position of the head assembly 456 relative to the magnetic tape 550, particular tracks of the magnetic tape 550 can be accessed precisely as desired, even with the increased track density of current and future LTO-compatible tape drives. In one embodiment, as shown, a single actuator 466 can be utilized to move the entire head assembly 456 and/or the individual bumps 470A, 470B, 470C of the head assembly 456 as determined is necessary. Alternatively, a separate actuator can be utilized to move each individual bump 470A, 470B, 470C of the head assembly 456 as determined is necessary.

In one embodiment, the actuator 466 is a piezoelectric actuator element. Alternatively, the actuator 466 can have another suitable design.

Figure 6A:
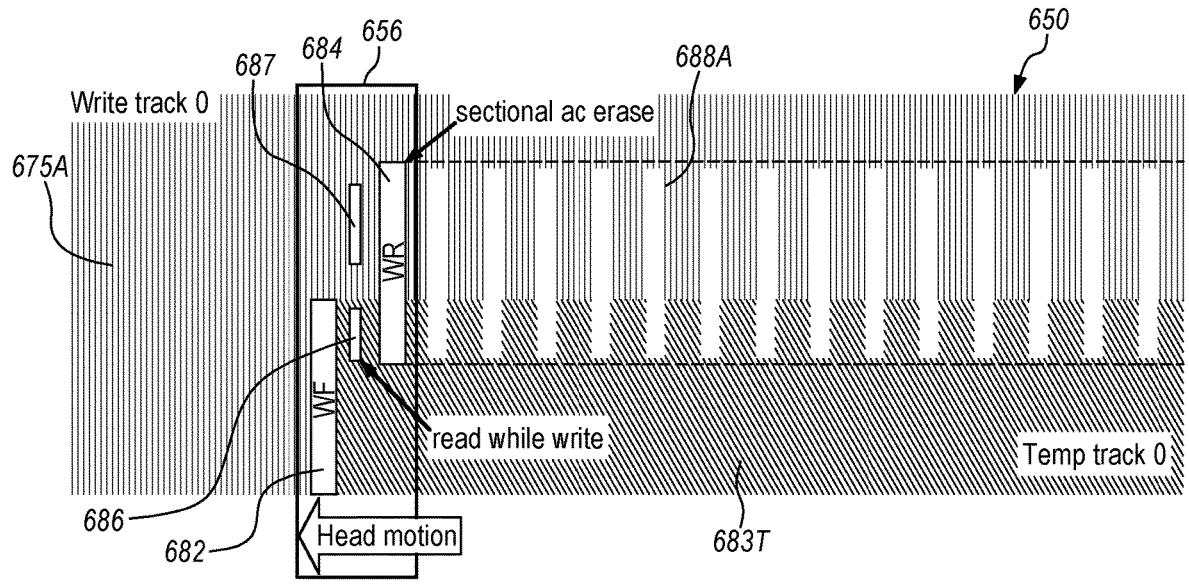
FIG. 6A is a simplified schematic illustration of a portion of a magnetic tape usable as part of the present invention during a first writing pass where data is being written to the magnetic tape, and a portion of an embodiment of the head assembly.

FIG. 6A is a simplified schematic illustration of a portion of a magnetic tape 650 usable as part of the present invention during a first forward writing pass where data is being written to the magnetic tape 650. FIG. 6A further illustrates a portion of a head assembly 656. More specifically, FIG. 6A illustrates a portion of a three-bump head assembly 656, similar to the embodiment illustrated in FIG. 4, that is being used to write data to and read data from the magnetic tape 650, in a read while write process, during a first forward writing pass based on head motion relative to the magnetic tape 650. It is appreciated that the relative right-to-left head motion indicated in FIG. 6A would typically be accomplished by moving the magnetic tape 650 relative to the head assembly 656 in a generally left-to-right direction in the implementation illustrated in FIG. 6A.

The head assembly 656 is further being utilized to modify and/or update an initial auxiliary servo pattern 675A (e.g., a tone pattern), which has been written onto the magnetic tape 650 by a tone writer 571 (illustrated in FIG. 5) prior to any data being written to the magnetic tape 650, to generate an updated auxiliary servo pattern 688A on the magnetic tape 650. The head assembly 656 is further configured to read the initial auxiliary servo pattern 675A and/or the updated auxiliary servo pattern 688A to effectively determine the precise lateral positional location of the head assembly 656 relative to the magnetic tape 650.

As illustrated in the embodiment shown in FIG. 6A, the head assembly 656 can include one or more of a forward write head 682, a reverse write head 684, a data reader 686, and an auxiliary servo reader 687. Alternatively, the head assembly 656 can include more components or fewer components than those specifically illustrated in FIG. 6A.

Along the left portion of the magnetic tape 650 in FIG. 6A, to the left of the head assembly 656, the magnetic tape 650 is shown as including the initial auxiliary servo pattern 675A (illustrated as a series of thin vertical lines) that has been written to the magnetic tape 650 by the tone writer 571 prior to data being written to the magnetic tape 650. In alternative embodiments, the tone writer 571 can be included within the tape drive 326 (illustrated in FIG. 3) or the tone writer 571 can be utilized during the process of manufacturing of the magnetic tape 650.

As the magnetic tape 650 moves in a general left-to-right (forward) direction relative to the head assembly 656 (and/or the head assembly 656 moves right-to-left relative to the magnetic tape 650), the forward write head 682 is configured to write an initial temporary data track 683T (labeled as "Temp track 0") onto the magnetic tape 656. As shown, the temporary data track 683T is written over a portion of the initial auxiliary servo pattern 675A.

The data reader 686 is configured to read the data (such as the temporary data track 683T at this point) that is being written by the forward write head 682 onto the magnetic tape 650 pursuant to the read while write format. As such, and as illustrated, the data reader 686 is positioned within the width of the forward write head 682 to ensure that the data reader 686 can effectively read such data tracks.

During such relative movement between the magnetic tape 650 and the head assembly 656 during this first forward writing pass, the auxiliary servo reader 687 is configured to read the initial auxiliary servo pattern 675A. At this point, because the auxiliary servo pattern has not yet been updated and/or modified, the auxiliary servo reader 687 is not yet able to identify the desired precise lateral positional location of the head assembly 656 relative to the magnetic tape 650. However, it is appreciated that at this point, the TBS servo readers 485A, 485B (illustrated in FIG. 4) are being utilized to read the TBS servo patterns within the TBS servo bands 573, 581 (illustrated in FIG. 5) to provide initial coarser servo information as to the lateral positional location of the head assembly 656 relative to the magnetic tape 650.

Also shown in FIG. 6A, during this same relative movement between the magnetic tape 650 and the head assembly 656, the reverse write head 684 is configured to update and/or modify a portion of the initial auxiliary servo pattern 675A to thus provide the updated auxiliary servo pattern 688A. It is appreciated that the reverse write head 684 can be configured to modify and/or update the initial auxiliary servo pattern 675A to thus provide the updated auxiliary servo pattern 688A in any suitable manner. For example, in one embodiment, the reverse write head 684 can be configured to use sectional ac erase to modify and/or update at least a portion of the auxiliary servo pattern 675A and the temporary data track 683T. Stated in another manner, in such embodiment, the reverse write head 684 utilizes sectional ac erase to erase part of the data of the temporary data track 683T that has just been written as well as a part of the tone (the initial auxiliary servo pattern 675A) from the tone writer 571. Alternatively, the reverse write head 684 can be configured to modify and/or update the auxiliary servo pattern in another suitable manner. More particularly, in certain alternative embodiments, the reverse write head 684 can be configured to utilize ac erase in a full ac erase procedure, to write a particular overwrite pattern over all or part of the auxiliary servo pattern, or to modify and/or update the auxiliary servo pattern in another suitable manner.

As described herein below, the updated auxiliary servo pattern 688A will be read by the auxiliary servo reader 687 during subsequent forward write passes to effectively identify the desired precise lateral positional location of the head assembly 656 relative to the magnetic tape 650. In order to effectively read the updated auxiliary servo pattern 688A in subsequent forward writing passes, as shown, it is appreciated that the auxiliary servo reader 687 must be positioned within the shadow of the reverse write head 684.

Figure 6B:
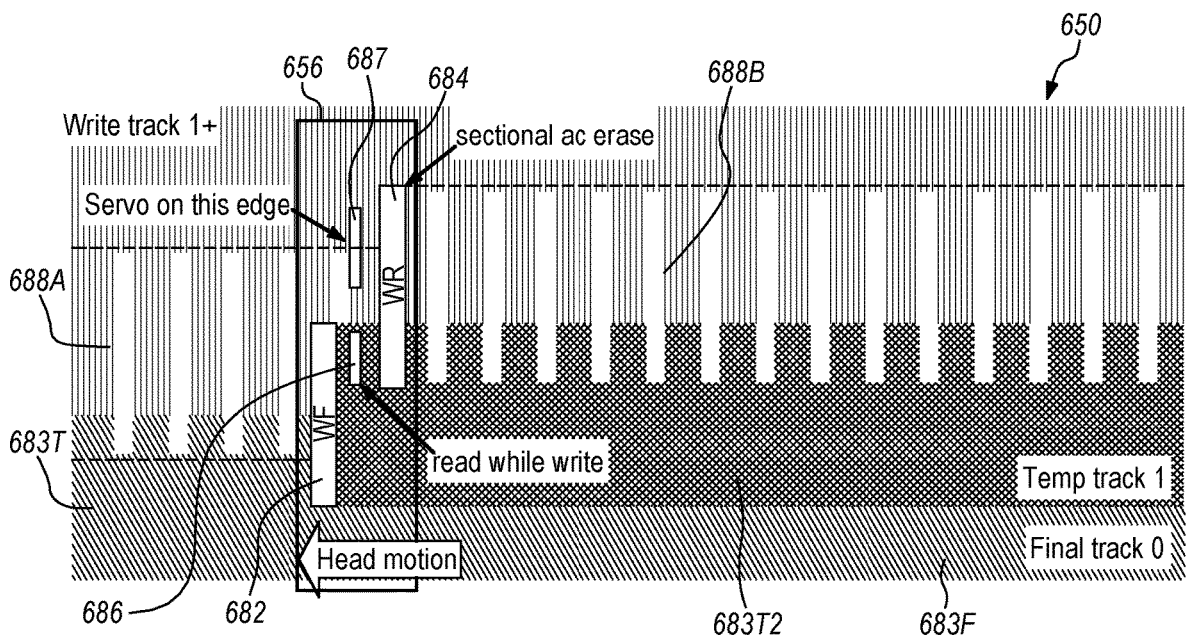
FIG. 6B is a simplified schematic illustration of the portion of the magnetic tape of FIG. 6A during a second writing pass where data is being written to the magnetic tape, and the portion of the head assembly of FIG. 6A.

FIG. 6B is a simplified schematic illustration of the portion of the magnetic tape 650 of FIG. 6A during a second forward writing pass where data is being written to the magnetic tape 650. FIG. 6B again illustrates the portion of the head assembly 656 of the three-bump design, including the forward write head 682, the reverse write head 684, the data reader 686, and the auxiliary servo reader 687, as illustrated in FIG. 6A.

During the second forward writing pass, as the magnetic tape 650 moves in a general left-to-right (forward) direction relative to the head assembly 656 (and/or the head assembly 656 moves right-to-left relative to the magnetic tape 650), the forward write head 682 is configured to overwrite or trim the temporary data track 683T generated during the first forward writing pass to provide a first final data track 683F (labeled as "Final track 0") onto the magnetic tape 650. At the same time, the forward write head 682 is also writing a second temporary data track 683T2 (labeled as "Temp track 1") onto the magnetic tape 650. As shown, the second temporary data track 683T2 is written over a portion of the updated auxiliary servo pattern 688A.

During such relative movement between the magnetic tape 650 and the head assembly 656 during this second forward writing pass, the auxiliary servo reader 687 is configured to read the updated auxiliary servo pattern 688A. More specifically, as shown, the updated auxiliary servo pattern 688A at this point includes some auxiliary servo pattern that has been modified and/or updated by the reverse write head 684 during the first forward writing pass, as well as some auxiliary servo pattern that has not yet been modified from the design of the initial auxiliary servo pattern 675A. By reading how much of the auxiliary servo pattern has been updated and how much of the auxiliary servo pattern has not yet been updated in forming the updated auxiliary servo pattern 688A, the auxiliary servo reader 687 is able to effectively determine the desired precise lateral positional location of the head assembly 656 relative to the magnetic tape 650. It is appreciated that this means of determining the desired precise lateral positional location of the head assembly 656 relative to the magnetic tape 650 is possible with the present invention even in current and future magnetic tapes with increased track density. It is also appreciated that this methodology is further usable without sacrificing any desired data space, as occurred in previous attempts to address this issue, as data tracks are ultimately written over the auxiliary servo patterns.

Also shown in FIG. 6B, during this same relative movement between the magnetic tape 650 and the head assembly 656, the reverse write head 684 is configured to update and/or modify a portion of the updated auxiliary servo pattern 688A to thus provide a subsequently updated auxiliary servo pattern 688B. It is appreciated that the reverse write head 684 can be configured to modify and/or update the updated auxiliary servo pattern 688A to thus provide the subsequently updated auxiliary servo pattern 688B in any suitable manner.

It is further appreciated that a substantially similar methodology can be utilized when the auxiliary servo pattern is written within the inter block gaps between data blocks within the data sub bands.

Figure 7A:
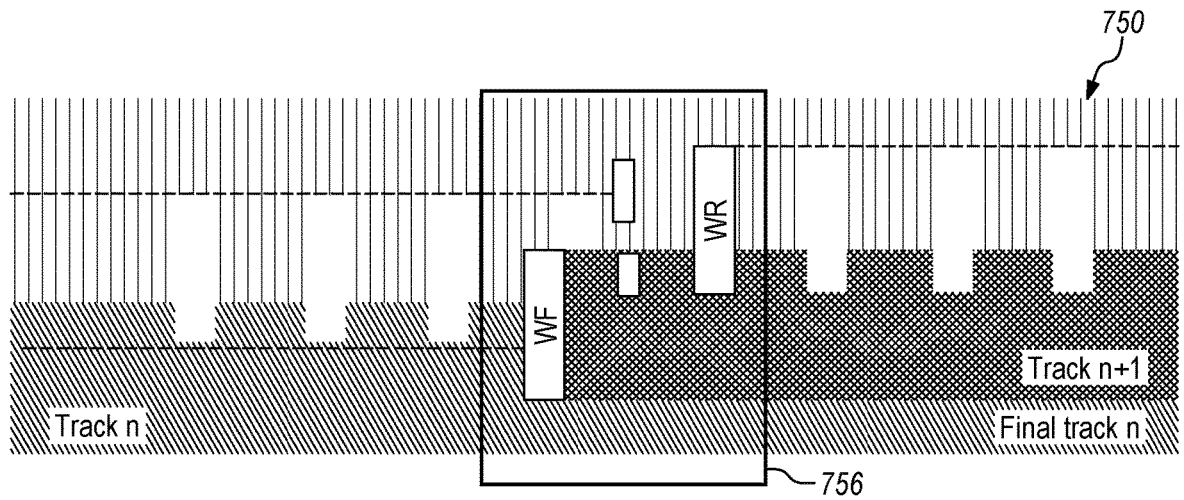
FIGS. 7A-7C are simplified schematic illustrations showing one particular implementation of the present invention where new data is being appended onto a magnetic tape that had previously written data without overwriting the previously written data.
Figure 7B:
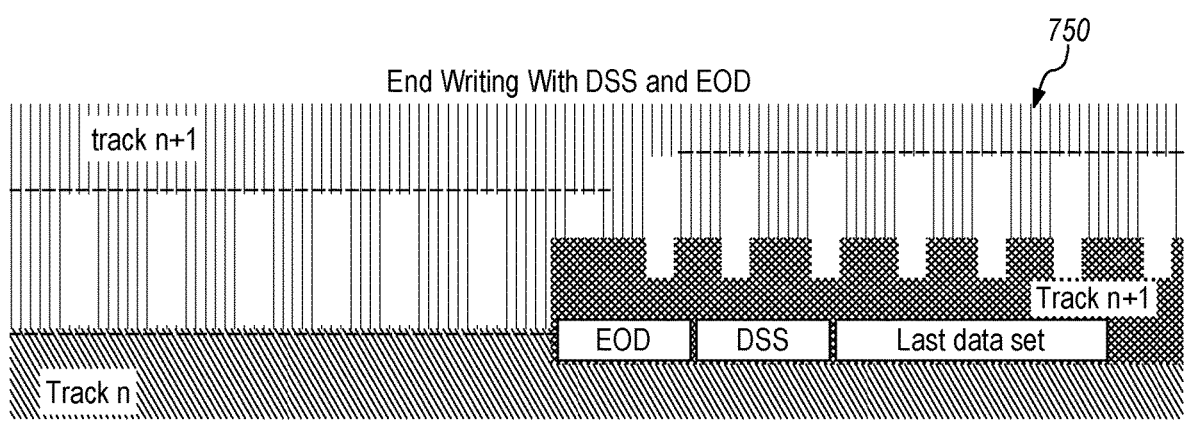
Figure 7C:
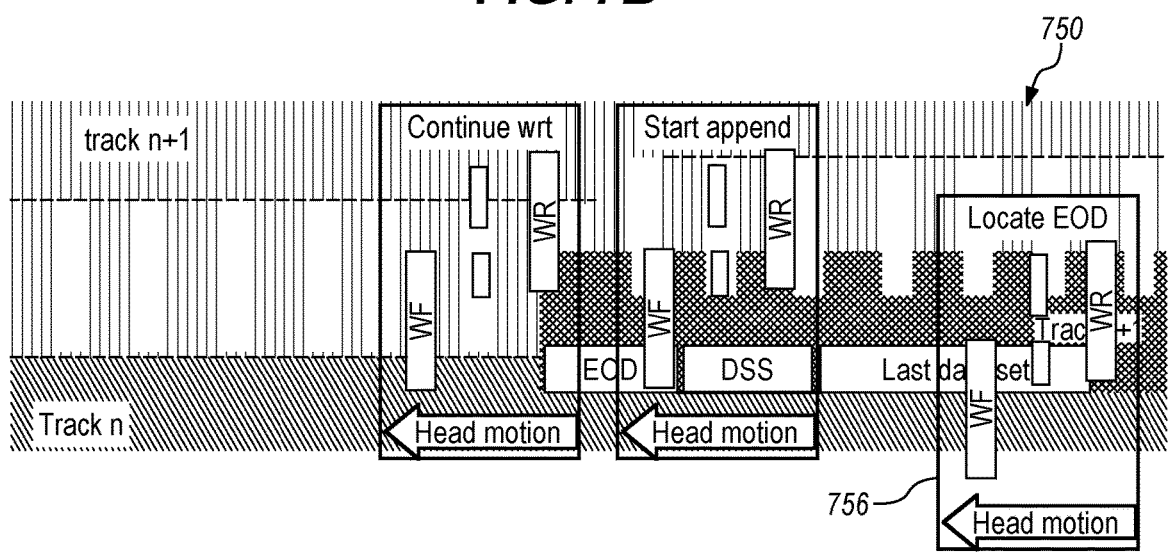

FIGS. 7A-7C are simplified schematic illustrations showing one particular implementation of the present invention where new data is being appended onto a magnetic tape 750 that had previously written data utilizing a head assembly 756 without overwriting the previously written data. More specifically, FIGS. 7A-7C illustrate use of the present invention as a means to identify end of data (EOD) from previous data that has been written to a magnetic tape 750 so that the system can accurately and precisely identify where along the magnetic tape 750 to start adding desired new data without overwriting the previously written data. Moreover, to err on the side of safety to inhibit overwriting of previous data, while also minimizing wasted space on the magnetic tape 750, the system involves inputting a data separator ("DSS") that includes a coarse pattern, which is identified between the last data set and what is defined and/or identified as the end of data (EOD) from the previously written data.

As shown in FIG. 7C, the general steps in this process include initially locating the EOD using the timing-based (TBS) servo system; overwriting the EOD using the TBS servo system; and then continuing writing of data at a point along the magnetic tape 750 where the embedded auxiliary servo pattern is available.

Figure 8A:
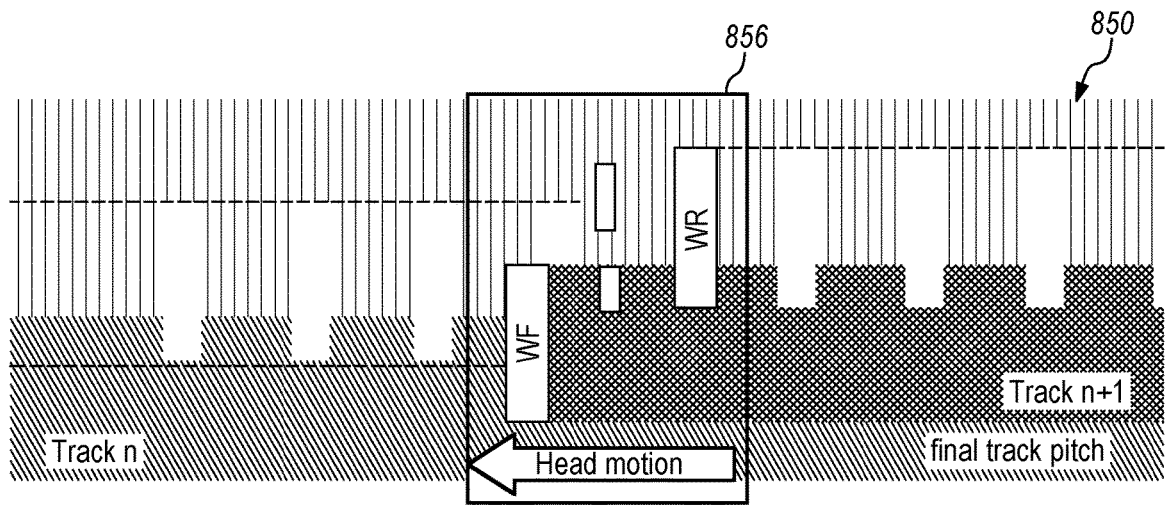
FIGS. 8A-8C are simplified schematic illustrations showing another particular implementation of the present invention where a subsequent data track is being written on a section of a magnetic tape that had a prior off-track event.
Figure 8B:
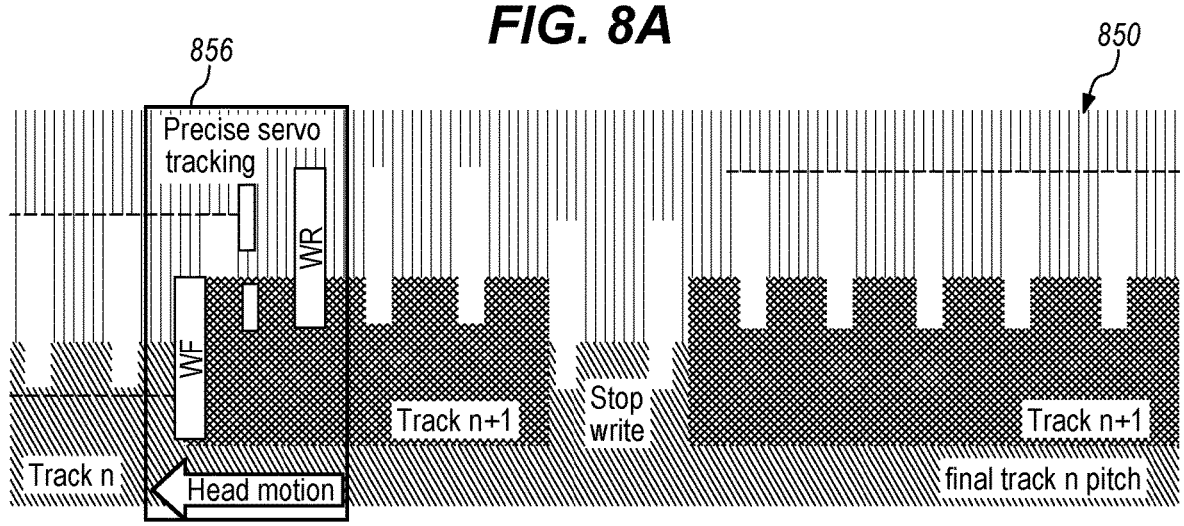
Figure 8C:
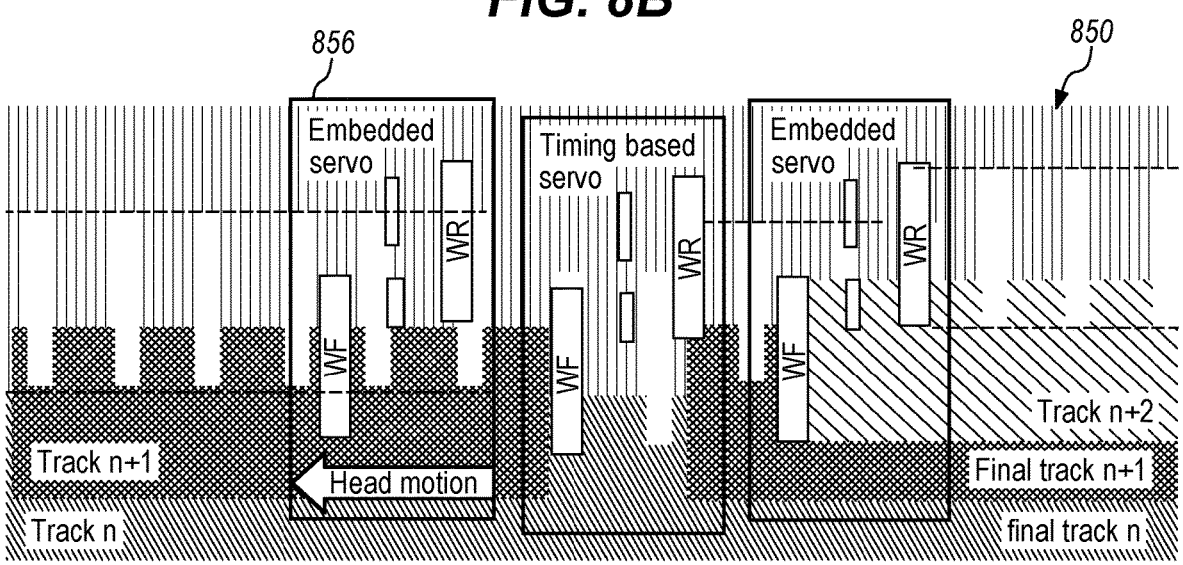

FIGS. 8A-8C are simplified schematic illustrations showing another particular implementation of the present invention where a subsequent data track is being written on a section of a magnetic tape 850 that had a prior off-track event. More particularly, FIGS. 8A-8C illustrate such implementation of the present invention where the system utilizes the embedded auxiliary servo pattern to ensure precise lateral positional location of the head assembly 856 relative to the magnetic tape 850 as data is being written to and/or read from the magnetic tape 850; subsequently utilizes the standard timing-based (TBS) servo system as means of identifying an off-track event; and then once again utilizing the embedded auxiliary servo pattern to ensure precise lateral positional location of the head assembly 856 relative to the magnetic tape 850 as data is being written to and/or read from the magnetic tape 850.

As described herein, the use of the auxiliary servo system of the present invention includes a writing portion and a reading portion that function in tandem to accurately determine the lateral position of a head assembly relative to the data tracks on the magnetic tape. The previous Figures generally focused on the writing portion of the auxiliary servo system. In the read portion of the auxiliary servo system, as described below in relation to FIG. 9, the present invention focuses simply on reading tracks, with the data already full on the magnetic tape.

Figure 9:
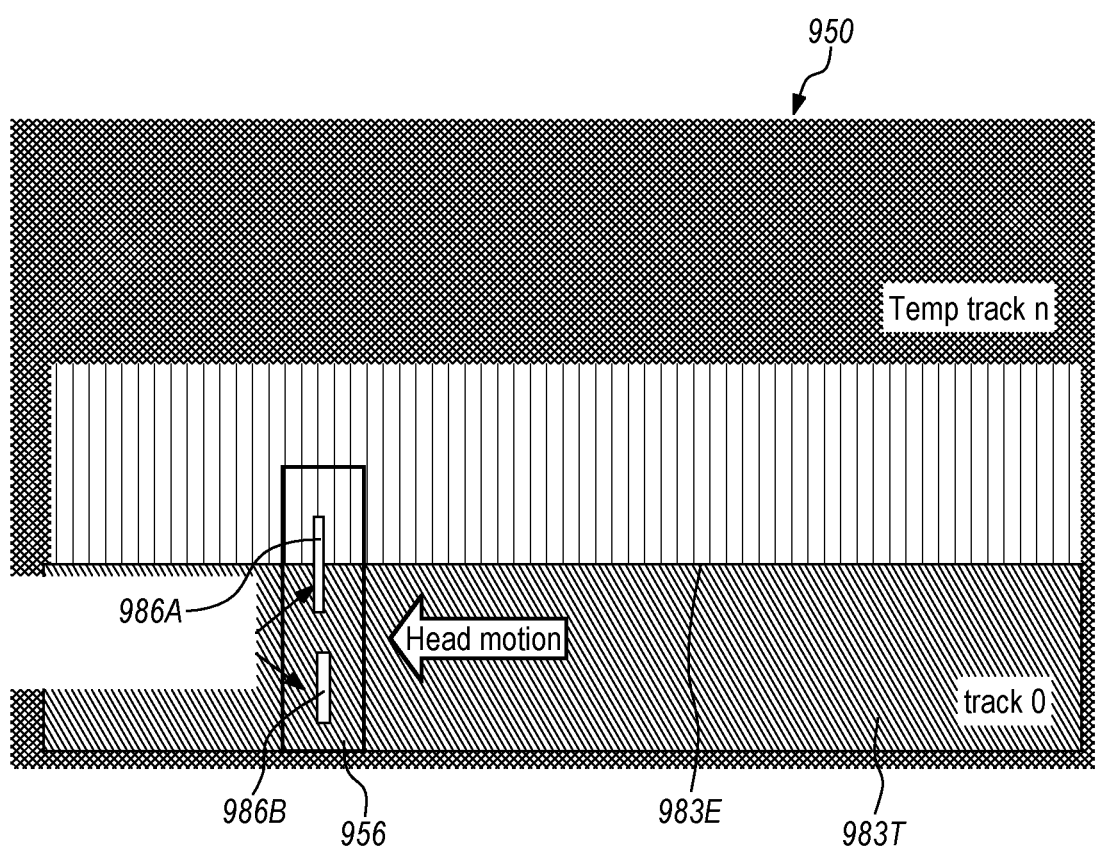
FIG. 9 is a simplified schematic illustration of a portion of a magnetic tape, and a portion of another embodiment of the head assembly that is usable during a read servo-based implementation of the present invention.

In particular, FIG. 9 is a simplified schematic illustration of a portion of a magnetic tape 950 including at least one final data track 983T (labeled as "track 0") and one or more temporary data tracks, and a portion of another embodiment of the head assembly 956 that is usable during a read servo-based implementation of the present invention. More specifically, FIG. 9 is a simplified schematic illustration showing the read servo portion using the implementation of the present invention where the head assembly 956 includes a first read head 986A, which can be used to identify a track edge 983E of the final data track 983T, and a second read head 986B, which can be used for reading the data in the final data track 983T.

In this embodiment, the first read head 986A can be a reverse read head, and the second read head 986B can be a forward read head. As shown, during a forward reading pass based on movement of the head assembly 956 relative to the magnetic tape 950, it is appreciated that the relative right-to-left head motion would typically be accomplished by moving the magnetic tape 950 relative to the head assembly 956 in a generally left-to-right direction. During such forward reading pass, the first read head 986A (such as the reverse read head in this embodiment) can be positioned to accurately identify the track edge 983E of the final data track 983T. In certain non-exclusive embodiments, the first read head 986A can utilize amplitude or error count as feedback in order to accurately identify the track edge 983E of the final data track 983T. Based on the design of the head assembly 956 and the particular lateral spacing between the first read head 986A and the second read head 986B, when the first read head 986A has accurately identified the track edge 983E of the final data track 983T, the second read head 986B (such as the forward read head in this embodiment) will be substantially centrally positioned over the final data track 983T so that the second read head 986B can accurately read the data within the final data track 983T. As such, during the forward reading pass, the first read head 986A functions as, and/or can be referred to as, an auxiliary servo head, as the first read head 986A is providing valuable servo information regarding the lateral positioning of the head assembly 956 relative to the magnetic tape 950.

Somewhat similarly, during a reverse reading pass based on movement of the head assembly 956 relative to the magnetic tape 950, it is appreciated that the relative left-to-right head motion would typically be accomplished by moving the magnetic tape 950 relative to the head assembly 956 in a generally right-to-left direction. During such reverse reading pass, the second read head 986B (such as the forward read head in this embodiment) can be positioned to accurately identify the track edge 983E of the final data track 983T. In certain non-exclusive embodiments, the second read head 986B can utilize amplitude or error count as feedback in order to accurately identify the track edge 983E of the final data track 983T. Based on the design of the head assembly 956 and the particular lateral spacing between the first read head 986A and the second read head 986B, when the second read head 986B has accurately identified the track edge 983E of the final data track 983T, the first read head 986A (such as the reverse read head in this embodiment) will be substantially centrally positioned over the final data track 983T so that the first read head 986A can accurately read the data within the final data track 983T. As such, during the reverse reading pass, the second read head 986B functions as, and/or can be referred to as, an auxiliary servo head, as the second read head 986B is providing valuable servo information regarding the lateral positioning of the head assembly 956 relative to the magnetic tape 950.

Thus, an important aspect of the present invention is deriving a "servo position" from the data position of the last data track edge and using it as an auxiliary "adjustment" to the timing servo.

Figure 10:
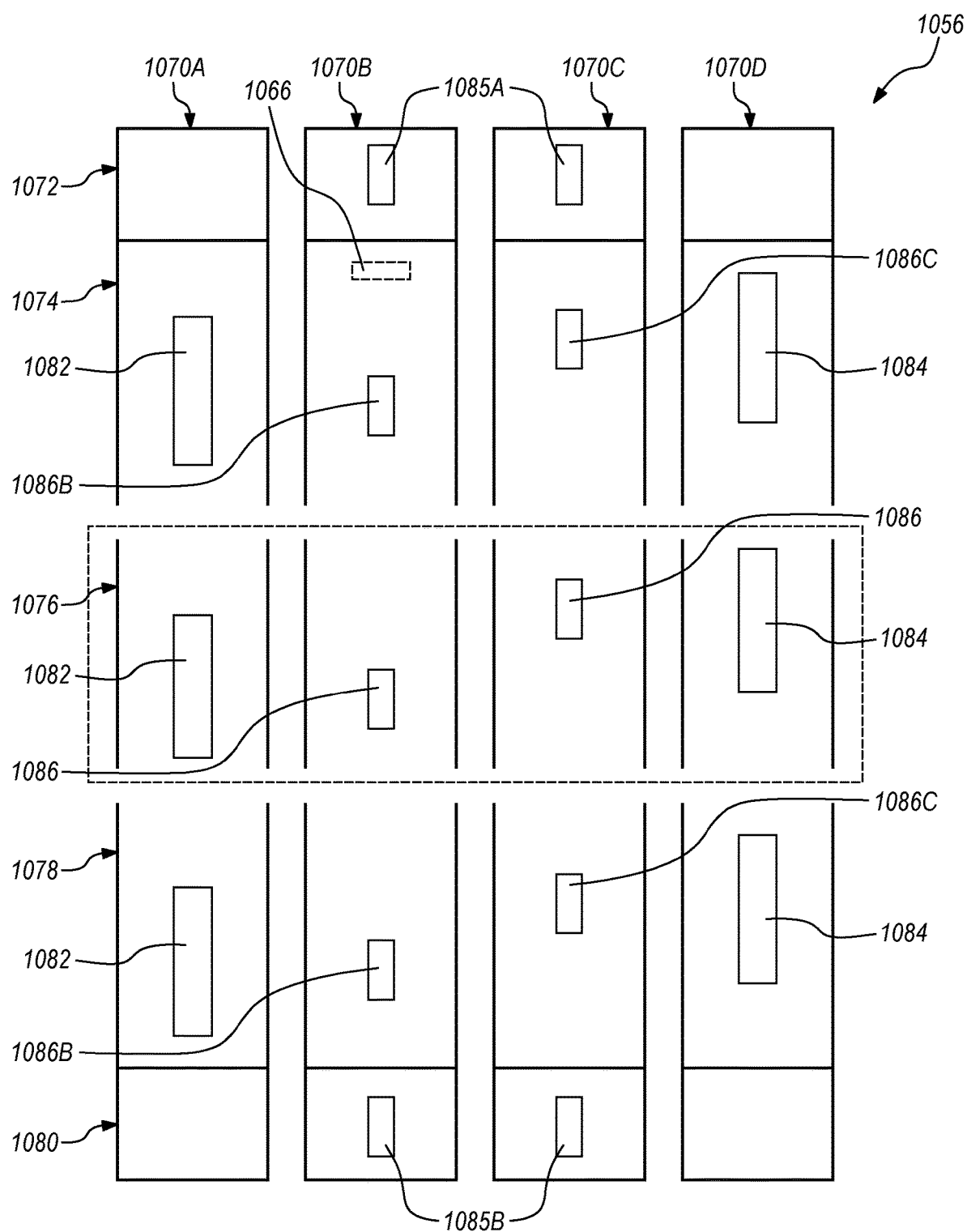
FIG. 10 is a simplified schematic illustration of a representative four-bump head assembly for use with the present invention, including a forward write head, a forward read/servo head, a reverse read/servo head, and a reverse write head.

FIG. 10 is a simplified schematic illustration of a representative four-bump head assembly 1056 for use with the present invention. As illustrated in this embodiment, the head assembly 1056 includes a first bump 1070A in the form of a forward write head bump, a second bump 1070B in the form of a forward read/servo head bump, a third bump 1070C in the form of a reverse read/servo head bump, and a fourth bump 1070D in the form of a reverse write head bump.

As shown, each bump 1070A, 1070B, 1070C, 1070D includes (i) a first outer section 1072 that is configured to largely correspond with and/or be substantially aligned with the first (upper) TBS servo band 573 (illustrated in FIG. 5) of the magnetic tape 550 (illustrated in FIG. 5) as the magnetic tape 550 moves across the head assembly 1056, (ii) a first data section 1074 that is configured to largely correspond with and/or be substantially aligned with the first data sub band 575 (illustrated in FIG. 5) of the magnetic tape 550 as the magnetic tape 550 moves across the head assembly 1056, (iii) a plurality of middle data sections 1076 (or "middle channels") that are configured to correspond with and/or be substantially aligned with the plurality of middle data sub bands 577 (illustrated in FIG. 5) of the magnetic tape 550 as the magnetic tape 550 moves across the head assembly 1056, (iv) a second data section 1078 that is configured to largely correspond with and/or be substantially aligned with the second data sub band 579 (illustrated in FIG. 5) of the magnetic tape 550 as the magnetic tape 550 moves across the head assembly 1056, and (v) a second outer section 1080 that is configured to largely correspond with and/or be substantially aligned with the second (lower) TBS servo band 581 (illustrated in FIG. 5) of the magnetic tape 550 as the magnetic tape 550 moves across the head assembly 1056.

In the first bump 1070A, each of the first data section 1074, the plurality of middle data sections 1076, and the second data section 1078 includes a forward write head 1082 that is usable to write data tracks 583 (illustrated in FIG. 5) onto the magnetic tape 550 during any and all forward writing passes when the magnetic tape 550 is moving in a generally forward direction relative to the head assembly 1056. In various implementations, during the forward writing passes, the forward write head 1082 can be writing data over at least a portion of the initial auxiliary servo pattern that has been embedded within the data tracks and/or the data bands.

Additionally, or in the alternative, in some embodiments, the forward write heads 1082 can be utilized to update and/or modify the initial auxiliary servo patterns 575A, 579A (illustrated in FIG. 5) during reverse writing passes when the magnetic tape 550 is moving in a generally reverse direction relative to the head assembly 1056. For example, in certain such embodiments, the forward write heads 1082 can employ ac erase functionality to erase all or sections of the initial auxiliary servo patterns 575A, 579A that are specifically covered by the forward write heads 1082 during reverse writing passes when the magnetic tape 550 is moving in a generally reverse direction relative to the head assembly 1056. Alternatively, the forward write heads 1082 can update and/or modify the initial auxiliary servo patterns 575A, 579A in another suitable manner other than using ac erase functionality. Moreover, it is appreciated that in each subsequent reverse writing pass, the forward write head 1082 may actually be updating and/or modifying an auxiliary servo pattern that has already been modified from the initial auxiliary servo pattern 575A, 579A.

In the fourth bump 1070D, each of the first data section 1074, the plurality of middle data sections 1076, and the second data section 1078 includes a reverse write head 1084 that is usable to write data tracks 583 onto the magnetic tape 550 during any and all reverse writing passes when the magnetic tape 550 is moving in a generally reverse direction relative to the head assembly 1056. In various implementations, during the reverse writing passes, the reverse write head 1084 can be writing data over at least a portion of the initial auxiliary servo pattern that has been embedded within the data tracks and/or the data bands.

Additionally, or in the alternative, in some embodiments, the reverse write heads 1084 can be utilized to update and/or modify the initial auxiliary servo patterns 575A, 579A during forward writing passes when the magnetic tape 550 is moving in a generally forward direction relative to the head assembly 1056. For example, in certain such embodiments, the reverse write heads 1084 can employ ac erase functionality to erase all or sections of the initial auxiliary servo patterns 575A, 579A that are specifically covered by the reverse write heads 1084 during forward writing passes when the magnetic tape 550 is moving in a generally forward direction relative to the head assembly 1056. Alternatively, the reverse write heads 1084 can update and/or modify the initial auxiliary servo patterns 575A, 579A in another suitable manner other than using ac erase functionality. Moreover, it is appreciated that in each subsequent forward writing pass, the reverse write head 1084 may actually be updating and/or modifying an auxiliary servo pattern that has already been modified from the initial auxiliary servo pattern 575A, 579A.

In this embodiment, the second bump 1070B and/or the third bump 1070C can include a first (upper) TBS servo reader 1085A in the first outer section 1072 that is configured to read the servo pattern (such as the typical chevron servo pattern) within the first (upper) TBS servo band 573; and a second (lower) TBS servo reader 1085B in the second outer section 1080 that is configured to read the servo pattern (such as the typical chevron servo pattern) within the second (lower) TBS servo band 581, to establish an initial and appropriate lateral position of the head assembly 1056 relative to the magnetic tape 550 before any data has been written to the magnetic tape 550. In some embodiments, each of the first bump 1070A and the fourth bump 1070D can include similar first (upper) TBS servo readers 1085A and second (lower) TBS servo readers 1085B to individually establish an initial and appropriate lateral position of each of the bumps 1070A, 1070B, 1070C, 1070D of the head assembly 1056 relative to the magnetic tape 550 before any data has been written to the magnetic tape 550.

As shown in FIG. 10, each of the first data section 1074 and the second data section 1078 of the second bump 1070B can include a data/servo reader 1086B that is positioned within the width of the forward write head 1082 that is positioned in such data sections 1074, 1078 of the first bump 1070A. As such, the data/servo readers 1086B that are positioned in the first data section 1074 and the second data section 1078 of the second bump 1070B are configured to read the desired data tracks 583 that have been written onto the magnetic tape 550 within the first data sub band 575 and the second data sub band 579 of the magnetic tape 550 in a read while writing procedure. In this embodiment, the data/servo readers 1086B that are positioned in the first data section 1074 and the second data section 1078 of the second bump 1070B can be further configured to read the auxiliary servo patterns (the initial auxiliary servo pattern and/or the modified/updated auxiliary servo pattern) that have been written onto the magnetic tape 550 within the first data sub band 575 and the second data sub band 579. For example, in one embodiment, the data/servo readers 1086B can be configured to read data when the magnetic tape 550 is moving relative to the head assembly 1056 in one direction (e.g., a forward direction), and the data/servo readers 1086B can be configured to read servo patterns when the magnetic tape 550 is moving relative to the head assembly 1056 in the opposite direction (e.g., a reverse direction).

Somewhat similarly, as further shown in FIG. 10, each of the first data section 1074 and the second data section 1078 of the third bump 1070C can include a data/servo reader 1086C that is positioned within the width of the reverse write head 1084 that is positioned in such data sections 1074, 1078 of the fourth bump 1070D. As such, the data/servo readers 1086C that are positioned in the first data section 1074 and the second data section 1078 of the third bump 1070C are configured to read the desired data tracks 583 that have been written onto the magnetic tape 550 within the first data sub band 575 and the second data sub band 579 of the magnetic tape 550 in a read while writing procedure. In this embodiment, the data/servo readers 1086C that are positioned in the first data section 1074 and the second data section 1078 of the third bump 1070C can be further configured to read the auxiliary servo patterns (the initial auxiliary servo pattern and/or the modified/updated auxiliary servo pattern) that have been written onto the magnetic tape 550 within the first data sub band 575 and the second data sub band 579. For example, in one embodiment, the data/servo readers 1086C can be configured to read data when the magnetic tape 550 is moving relative to the head assembly 1056 in one direction (e.g., a reverse direction), and the data/servo readers 1086C can be configured to read servo patterns when the magnetic tape 550 is moving relative to the head assembly 1056 in the opposite direction (e.g., a forward direction).

As illustrated in this embodiment, the second bump 1070B can further include a data reader 1086 in each of the middle data sections 1076 that is positioned within the width of the forward write head 1082 that is positioned in each of the middle data sections 1076 of the first bump 1070A. As such, the data readers 1086 are positioned and configured to read the desired data tracks 583 that have been written onto the magnetic tape 550 within the plurality of middle data sub bands 577 of the magnetic tape 550 in a read while writing procedure when the magnetic tape 550 is moving relative to the head assembly 1056 in a forward direction.

Somewhat similarly, the third bump 1070C can further include a data reader 1086 in each of the middle data sections 1076 that is positioned within the width of the reverse write head 1084 that is positioned in each of the middle data sections 1076 of the fourth bump 1070D. As such, the data readers 1086 are positioned and configured to read the desired data tracks 583 that have been written onto the magnetic tape 550 within the plurality of middle data sub bands 577 of the magnetic tape 550 in a read while writing procedure when the magnetic tape 550 is moving relative to the head assembly 1056 in a reverse direction.

Further illustrated in FIG. 10 is an actuator 1066 (illustrated in phantom) that can be communicatively coupled to the head assembly 1056. The actuator 1066 is configured to control the lateral position of the head assembly 1056 and/or the individual bumps 1070A, 1070B, 1070C, 1070D of the head assembly 1056 relative to the magnetic tape 550 based at least in part on the TBS servo patterns read by the TBS servo readers 1085A, 1085B, and the auxiliary servo patterns 575A, 579A read by the data/servo readers 1086B, 1086C. As such, the actuator 1066 comprises a mechanical positioner to move the head assembly 1056 up or down laterally relative to the magnetic tape 550. By controlling the lateral position of the head assembly 1056 relative to the magnetic tape 550, particular tracks of the magnetic tape 550 can be accessed precisely as desired, even with the increased track density of current and future LTO-compatible tape drives. In one embodiment, as shown, a single actuator 1066 can be utilized to move the entire head assembly 1056 and/or the individual bumps 1070A, 1070B, 1070C, 1070D of the head assembly 1056 as determined is necessary. Alternatively, a separate actuator can be utilized to move each individual bump 1070A, 1070B, 1070C, 1070D of the head assembly 1056 as determined is necessary.

In one embodiment, the actuator 1066 is a piezoelectric actuator element. Alternatively, the actuator 1066 can have another suitable design.

In summary, as described in various embodiments disclosed herein, the present invention enables certain advantages and/or benefits such as (1) High feedback rate with embedded servo tracking accuracy to prevent over-trimming during write; (2) Single tone pattern addition to the tape format without the need for a specially controlled servo writer. This is much simpler by comparison than the multi-tone pattern required by HD servo schemes; and (3) No additional tape area wasted once data is written, which is a desirable feature for WORM (write once, read many) applications.

More particularly, the present invention illustrates a magnetic tape storage system that can write operate with some or all of the benefits of an auxiliary high-density servo pattern without using extra tape area that could be used for writing additional data to the tape. As described in various embodiments herein, in addition to using conventional timing-based servo (TBS) that provides rough indirect measurements to determine the lateral position of the tape head relative to data tracks on the tape, the system provides an auxiliary servo pattern that is embedded within the data tracks and is subsequently modified and updated during writing passes to provide a more direct measurement of the desired precise locational servo information without sacrificing space usable for writing additional data to the tape. For purposes of another implementation of the present invention, it is appreciated that the magnetic tape will typically include one or more data blocks within each data band, with inter block gaps being positioned between adjacent data blocks, where no data is typically written within the inter block gaps. In such implementation, the auxiliary servo pattern can be embedded within the inter block gaps between adjacent data blocks. In still another implementation of the present invention, an auxiliary servo head can be utilized to accurately identify a track edge of a given data track within the data band. In such implementation, a read head can be positioned at a lateral distance away from the auxiliary servo head such that the read head can be substantially centrally positioned relative to the given data track when the auxiliary servo head is positioned over the track edge of the given data track. It is appreciated that in each such implementation of the present invention, no data space is ultimately being sacrificed to enable the enable the auxiliary servo system to effectively and precisely identify the lateral position of the read head relative to the data tracks at any given time.

In summary, the present invention enables a magnetic tape-recording system to achieve the same accuracy and response rate as an embedded servo (wedge servo) system without sacrificing extra tape surfaces designated for the auxiliary high-density servo pattern, which can be a very desirable feature for WORM (write once, read many) tape cartridges. More specifically, as described in various embodiments disclosed herein, the present invention enables certain advantages and/or benefits (better than the current existing products with only the conventional timing-based HD servo schemes, and without the drawbacks and disadvantages of previous attempts to address the issue of generating precise servo information for LTO-compatible tape systems with ever-increasing track densities) such as (1) High feedback rate with embedded servo tracking accuracy to prevent over-trimming during write; (2) Single tone pattern addition to the tape format without the need for a specially controlled servo writer. This is much simpler by comparison than the multi-tone pattern required by HD servo schemes; and (3) No additional tape area wasted once data is written, which is a desirable feature for WORM (write once, read many) applications.

In some embodiments, the present invention includes modifications to head and tape format design that enable the desired advantages as described herein. In other embodiments, the present invention includes modifications to the writer and servo system design to enable such desired advantages. It is further appreciated that one or more embodiments can include both modifications to head and tape format design, and modifications to the writer and servo system design.

It is appreciated that the present invention, as described in detail herein, can be further utilized and/or modified in various manners to provide additional advantages and/or benefits. For example, current and future narrow TMR sensors are known to become clogged or damaged much easier than the predecessors. Hence, the system is designed to write functional even with several bad data channels. That is a luxury not available in the servo channel. Thus, to improve servo reliability, the concept in this invention can be extended to have more than one servo reader with pre-written tone on its corresponding area on tape. In one such implementation, tape manufacturers could put a single tone to the entire width, then add bands of the TBS chevron to allow operation with multiple high-definition precision servo support. In this manner, the accuracy is more precise with consideration of channel-to-channel variation, and the corresponding results can be robust even when some servo sensors been compromised.

In another example, a servo reader in one direction can be used as the data reader to perform read after write function, such as illustrated and described in relation to FIG. 10. In such implementations, it is up to the head/drive manufacturers, with consideration of the manufacturing process complexity, to take advantage of this duality.

Additionally, it is known that the writer width is a main variation in the current servo system. To account for that, a calibration step can be implemented in the factory to set the targeted output ratio for the embedded servo.

It is understood that although a number of different embodiments of a servo system have been illustrated and described herein, one or more features of any one embodiment can be combined with one or more features of one or more of the other embodiments, provided that such combination satisfies the intent of the present invention.

While a number of exemplary aspects and embodiments of the servo system have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A servo system for use within a magnetic tape storage system, the servo system comprising:
   a magnetic tape including (i) a first servo band including a timing-based servo pattern, and (ii) a first data band that is configured such that data is to be written to and read from the first data band;
   wherein an auxiliary servo pattern is embedded within the first data band; and
   wherein the auxiliary servo pattern is modified to generate an updated auxiliary servo pattern during a writing pass as data is being written to the first data band.

2. The servo system of claim 1 wherein the auxiliary servo pattern is an initial auxiliary servo pattern that is embedded within the first data band by a tone writer prior to any data being written to the first data band.

3. The servo system of claim 2 further comprising a magnetic tape drive including a head assembly that is configured to write data to the first data band of the magnetic tape; and wherein the tone writer is positioned within the magnetic tape drive.

4. The servo system of claim 2 wherein the tone writer is configured to embed the initial auxiliary servo pattern within the first data band during manufacturing of the magnetic tape.

5. The servo system of claim 1 further comprising a magnetic tape drive including a head assembly that is configured to write data to the first data band of the magnetic tape, the head assembly having (i) a first write head that is configured to write data to the magnetic tape as the magnetic tape moves relative to the head assembly in a first tape direction, (ii) a second write head that is configured to write data to the magnetic tape as the magnetic tape moves relative to the head assembly in a second tape direction that is opposite to the first tape direction, and (iii) an auxiliary servo reader that is positioned in a shadow of one of the first write head and the second write head.

6. The servo system of claim 5 wherein the second write head is further configured to modify the auxiliary servo pattern to generate the updated auxiliary servo pattern during a writing pass as data is being written by the first write head to the first data band; and wherein the auxiliary servo reader is configured to read the updated auxiliary servo pattern during the writing pass to determine a lateral position of the head assembly relative to the magnetic tape.

7. The servo system of claim 6 wherein the second write head employs ac erase functionality to modify the auxiliary servo pattern to generate the updated auxiliary servo pattern during the writing pass as data is being written by the first write head to the first data band.

8. The servo system of claim 6 wherein the magnetic tape drive further includes (i) a drive controller that is communicatively coupled to the head assembly, the drive controller being configured to receive information from the auxiliary servo reader to generate a signal based at least in part on the updated auxiliary servo pattern that has been read by the auxiliary servo reader during the writing pass; and (ii) an actuator that is coupled to the head assembly, the actuator being controlled by the drive controller to adjust the lateral position of the head assembly relative to the magnetic tape based at least in part on the updated auxiliary servo pattern that has been read by the auxiliary servo reader during the writing pass.

9. The servo system of claim 5 wherein the head assembly includes (i) a first bump in the form of a forward write bump that includes the first write head, (ii) a second bump in the form of a read head bump that includes the auxiliary servo reader, and (iii) a third bump in the form of a reverse write bump that includes the second write head.

10. The servo system of claim 5 wherein the head assembly further includes a TBS servo reader that is configured to read the timing-based servo pattern included in the first servo band.

11. A servo system for use within a magnetic tape storage system, the servo system comprising:
a magnetic tape drive including a head assembly having (i) a first write head that is configured to write data to a magnetic tape as the magnetic tape moves relative to the head assembly in a first tape direction, (ii) a second write head that is configured to write data to the magnetic tape as the magnetic tape moves relative to the head assembly in a second tape direction that is opposite to the first tape direction, and (iii) an auxiliary servo reader that is positioned in a shadow of one of the first write head and the second write head;
wherein the magnetic tape includes a first data band that is configured such that data is to be written to and read from the first data band;
wherein an auxiliary servo pattern is embedded within the first data band; and
wherein the auxiliary servo pattern is an initial auxiliary servo pattern that is embedded within the first data band by a tone writer prior to any data being written to the first data band.

12. The servo system of claim 11 wherein the tone writer is positioned within the magnetic tape drive.

13. The servo system of claim 11 wherein the tone writer is configured to embed the initial auxiliary servo pattern within the first data band during manufacturing of the magnetic tape.

14. The servo system of claim 11 wherein the head assembly includes (i) a first bump in the form of a forward write bump that includes the first write head, (ii) a second bump in the form of a read head bump that includes the auxiliary servo reader, and (iii) a third bump in the form of a reverse write bump that includes the second write head.

15. The servo system of claim 11 wherein the head assembly further includes a TBS servo reader that is configured to read a timing-based servo pattern included in a first servo band of the magnetic tape.

16. A servo system for use within a magnetic tape storage system, the servo system comprising:
a magnetic tape drive including a head assembly having (i) a first write head that is configured to write data to a magnetic tape as the magnetic tape moves relative to the head assembly in a first tape direction, (ii) a second write head that is configured to write data to the magnetic tape as the magnetic tape moves relative to the head assembly in a second tape direction that is opposite to the first tape direction, and (iii) an auxiliary servo reader that is positioned in a shadow of one of the first write head and the second write head;
wherein the magnetic tape includes a first data band that is configured such that data is to be written to and read from the first data band;
wherein an auxiliary servo pattern is embedded within the first data band; and
wherein the auxiliary servo pattern is modified to generate an updated auxiliary servo pattern during a writing pass as data is being written to the first data band.

17. The servo system of claim 16 wherein the second write head is further configured to modify the auxiliary servo pattern to generate the updated auxiliary servo pattern during a writing pass as data is being written by the first write head to the first data band; and wherein the auxiliary servo reader is configured to read the updated auxiliary servo pattern during the writing pass to determine a lateral position of the head assembly relative to the magnetic tape.

18. The servo system of claim 17 wherein the second write head employs ac erase functionality to modify the auxiliary servo pattern to generate the updated auxiliary servo pattern during the writing pass as data is being written by the first write head to the first data band.

19. The servo system of claim 17 wherein the magnetic tape drive further includes (i) a drive controller that is communicatively coupled to the head assembly, the drive controller being configured to receive information from the auxiliary servo reader to generate a signal based at least in part on the updated auxiliary servo pattern that has been read by the auxiliary servo reader during the writing pass, and (ii) an actuator that is coupled to the head assembly, the actuator being controlled by the drive controller to adjust the lateral position of the head assembly relative to the magnetic tape based at least in part on the updated auxiliary servo pattern that has been read by the auxiliary servo reader during the writing pass.

20. The servo system of claim 16 wherein the head assembly includes (i) a first bump in the form of a forward write bump that includes the first write head, (ii) a second bump in the form of a read head bump that includes the auxiliary servo reader, and (iii) a third bump in the form of a reverse write bump that includes the second write head.

21. The servo system of claim 16 wherein the head assembly further includes a TBS servo reader that is configured to read a timing-based servo pattern included in a first servo band of the magnetic tape.

22. A servo system for use within a magnetic tape storage system, the servo system comprising:

a magnetic tape including (i) a first servo band including a timing-based servo pattern, and (ii) a first data band that is configured such that data is to be written to and read from the first data band, an auxiliary servo pattern being embedded within the first data band by a tone writer prior to any data being written to the first data band; and a magnetic tape drive including a head assembly having (i) a first write head that is configured to write data to a magnetic tape as the magnetic tape moves relative to the head assembly in a first tape direction, (ii) a second write head that is configured to write data to the magnetic tape as the magnetic tape moves relative to the head assembly in a second tape direction that is opposite to the first tape direction, (iii) a TBS servo reader that is configured to read the timing-based servo pattern included in the first servo band of the magnetic tape, and (iv) an auxiliary servo reader that is positioned in a shadow of one of the first write head and the second write head;

wherein the second write head is further configured to modify the auxiliary servo pattern to generate an updated auxiliary servo pattern during a writing pass as data is being written by the first write head to the first data band; and wherein the auxiliary servo reader is configured to read the updated auxiliary servo pattern during the writing pass to determine a lateral position of the head assembly relative to the magnetic tape.

* * * * *